(12) United States Patent
Everitt

(10) Patent No.: US 6,668,701 B1
(45) Date of Patent: Dec. 30, 2003

(54) PISTON SEAL

(75) Inventor: David Geoffrey Everitt, West Midlands (GB)

(73) Assignee: United Industries Operations Limited (GB)

(*) Notice: Subject to any disclaimer, the term of this patent is extended or adjusted under 35 U.S.C. 154(b) by 108 days.

(21) Appl. No.: 09/889,205

(22) PCT Filed: Nov. 13, 2000

(86) PCT No.: PCT/GB00/04325

§ 371 (c)(1),
(2), (4) Date: Sep. 14, 2001

(87) PCT Pub. No.: WO01/34981

PCT Pub. Date: May 17, 2001

(30) Foreign Application Priority Data

Nov. 12, 1999 (GB) .............................................. 9926671

(51) Int. Cl.[7] .............................................. F16J 15/18
(52) U.S. Cl. ................................... 92/165 R; 92/170.1
(58) Field of Search .............................. 92/165 R, 168, 92/86, 170.1, 171.1; 417/570, 569, 571

(56) References Cited

U.S. PATENT DOCUMENTS 4,211,151 A    7/1980  Wallischeck
4,449,446 A  *  5/1984  Degnan et al. ................ 92/146

FOREIGN PATENT DOCUMENTS

EP    0898077     2/1999
FR    2105820     4/1972
JP    11280669    10/1999

OTHER PUBLICATIONS

Inter. Search Report, filed Feb. 13, 2001.

* cited by examiner

Primary Examiner—Edward K. Look
Assistant Examiner—Michael Leslie
(74) Attorney, Agent, or Firm—Brooks Kushman P.C.

(57) ABSTRACT

In an assembly, e.g. a fluid pump, comprising an elongate member (e.g. a displacement rod (16)) slidably disposed with respect to a sealing member (e.g. seal (18)) the elongate member comprises a resiliently deformable sleeve or coating (74) and the sealing member (18) is substantially rigid and engages the sleeve or coating (74) and resiliently deforms it in the region of contact. There may also be means (82, 300, 352) for removing unwanted deposits from the elongate member.

39 Claims, 27 Drawing Sheets

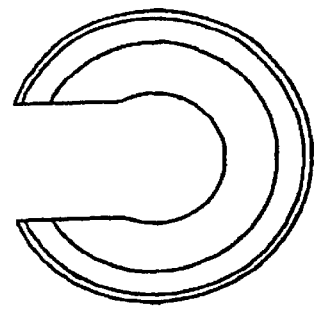
FIG.20(c).
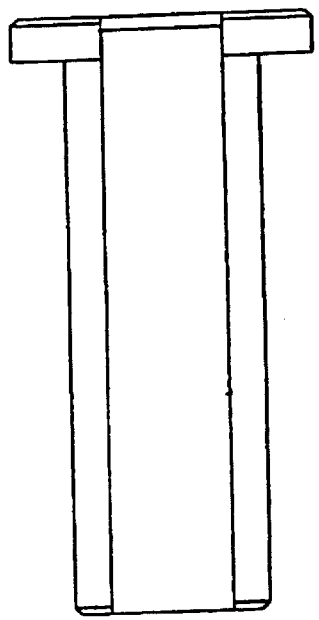
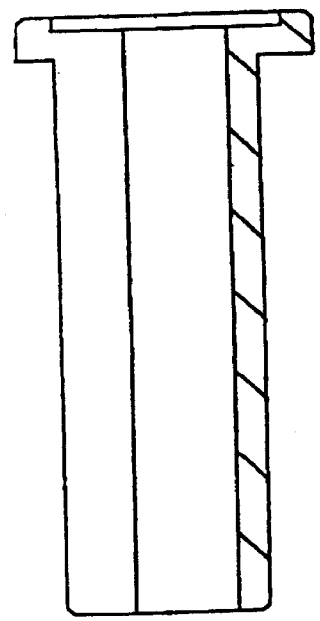
FIG.20(a).  FIG.20(b).

PISTON SEAL

The present invention relates to the sealing of relatively movable parts and to the sealing of relatively movable parts within pumping apparatus, particularly (but not exclusively) pumping apparatus for viscous fluids which are sensitive to shearing forces within the fluid.

A number of different types of pumps are used to pump liquids. However, problems can occur with the pumping of viscous fluids which are prone to set if subjected to high frictional forces.

One such viscous fluid is UV ink, which is an ink of a high viscosity which cures when subjected to ultra-violet radiation. The properties of the UV ink which enable it to set when it is irradiated unfortunately render it very sensitive to friction. Viscous fluids require the build up of a high pressure in order for them to be pumped.

One pump which is known to provide very little frictional force on the material being pumped is a double-diaphragm pump. Double-diaphragm pumps do not have a sliding surface between which the material to be pumped travels and therefore there is little chance of a high frictional force being generated which might cure the material. However, due to the inherent limitation of the flexible diaphragm material these pumps are restricted to low pressure applications, namely a maximum of about 13.6 atmospheres (200 Psi). Thus, such pumps are not suitable for pumping material of a high viscosity.

Other known pumps include single and double-acting pumps which have a piston which is reciprocated between an inlet and an outlet such that fluid is forced from below the piston to above the piston during a pumping cycle. In one type of double-acting pump fluid is forced between two separate chambers in the pump and a valve between the chambers allows the fluid to be forced through small apertures which open between the two chambers during displacement of the piston. In another type of pump the piston itself has several small apertures through which the fluid is forced, during the reciprocating movement of the piston, in order to move fluid from the inlet to the outlet. When reciprocated in the opposite direction, the piston is now required to force the fluid that has been passed through its small apertures out of the second chamber through the outlet of the pump. A valve is used to seal the piston apertures but the piston itself has to be slidingly sealed to the chamber wall.

Each of the above pumps therefore has the drawback that the small clearances and the meshing of several opposing surfaces can produce a high frictional force on the fluid being pumped which cause shear sensitive materials such as UV ink to cure within the pump and consequently cause the pump to fail.

It is essential in the single and double-acting pumps for there to be a very efficient seal between the piston and the cylinder within which it is disposed. If fluid is allowed to pass the seal, it is subjected to friction which causes the ink to set and which normally causes very rapid seizure of the pump. It is possible to design seals which provide the necessary high degree of sealing, but they are relatively expensive and require skilled maintenance from time to time.

It is an object of the present invention to provide a sealing arrangement between relatively movable parts which overcomes or alleviates the problems of the prior art.

In accordance with a first aspect of the present invention, in an assembly comprising an elongate member slidably disposed with respect to a sealing member, the elongate member comprises a resiliently deformable sleeve or coating and the sealing member comprises a substantially rigid sealing portion which engages the sleeve or coating and resiliently deforms it in the region of contact.

By providing an elongate resilient area, different portions of the resilient sleeve or coating are frictionally engaged as the elongate member moves. This is in contrast to the prior art having a fixed, resilient seal, which is continuously and frictionally engaged as the elongate member moves.

The sleeve or coating may comprise a single layer, for example polyurethane. Alternatively, the sleeve or coating may comprise a plurality of layers. For example, the sleeve or coating may comprise a resilient inner sleeve (of polyurethane) and an outer sleeve of a different material (e.g. PTFE).

The sleeve or coating need only be provided in that region of the elongate member which will frictionally engage the substantially rigid sealing portion.

In accordance with a second aspect of the present invention, in an assembly comprising a piston slidably disposed within a cylinder, the cylinder comprises a resiliently deformable lining and the piston comprises a substantially rigid sealing portion which engages the lining and resiliently deforms it in the region of contact.

Such an arrangement ensures that different parts of the lining are frictionally engaged by the piston as the piston moves. This is in contrast to the prior art in which a resilient seal on the piston is in continuous frictional engagement with the cylinder wall.

The lining may comprise a single layer (e.g. polyurethane). Alternatively, the lining may comprise a plurality of layers. For example, the lining may comprise an outer, resiliently deformable layer (e.g. polyurethane) and an inner layer (e.g. PTFE).

In accordance with a third aspect of the present invention, a fluid pump comprises a housing having an internal displacement chamber, an inlet, an outlet and a displacement rod which passes reciprocally into the displacement chamber through an aperture in the wall of the pump housing, wherein the displacement rod comprises a resiliently deformable sleeve or coating and the housing comprises a sealing member having a substantially rigid sealing portion which engages the sleeve or coating and resiliently deforms it in the region of contact In accordance with a fourth aspect of the present invention, a fluid pump comprises a housing having an internal displacement chamber, an inlet, an outlet and a displacement rod which is reciprocable sealingly within the displacement chamber, the displacement chamber comprising a resiliently deformable lining and the piston comprising a substantially rigid sealing portion which engages the lining and resiliently deforms it in the region of contact.

In all of the above aspects, the substantially rigid sealing portion is preferably annular and the resiliently deformable portion with which the substantially rigid sealing portion is engageable is tubular.

In accordance with a fifth aspect of the present invention, a fluid pump comprises a housing having an internal displacement chamber, an inlet, an outlet and a displacement rod which passes reciprocally into the displacement chamber through an aperture in the wall of the pump housing, the pump further comprising inner and outer spaced apart seal means which engage the outer surface of the displacement rod and means for applying fluid to the surface of that portion of the displacement rod between the inner and outer seal means.

In one embodiment, the means for applying fluid comprises an annular piston carried by the displacement rod, the piston having a sealing surface of non-constant profile which is releasably engageable with a seal means to isolate a volume of fluid to be applied and which is movable to compress the isolated volume of fluid and thereby displace it towards the displacement rod. Preferably, the piston comprises a first portion of smaller diameter which is releasably engageable with the seal means and a second portion of larger diameter, whereby movement of the larger diameter portion towards the seal means reduces the isolated volume and thereby compresses the fluid to be applied to the rod.

There may also be pressure means to assist in the application of the fluid to the surface of the rod. This may comprise pressurised gas which causes the fluid to be sprayed onto the surface of the displacement rod. This may conveniently be obtained from the exhaust of an air actuator used for displacing the displacement rod.

Preferably, the displacement rod comprises a resiliently deformable sleeve or coating and the inner and outer seal means are substantially rigid.

In accordance with a sixth aspect of the present invention, a fluid pump comprises a housing having an internal displacement chamber, an inlet, an outlet, a displacement rod which passes reciprocally into the displacement chamber through an aperture in the wall of the pump housing and seal means which engage the outer surface of the displacement rod and define a boundary of the displacement chamber, the pump further comprising guide means to ensure that fluid displaced by the displacement rod passes over the inner portion of the seal means before being discharged through the outlet.

Such a construction ensures that the inner face of the seal is "flushed" during each stroke of the displacement rod, which helps to avoid build-up of deposits on the rod which might otherwise lead to pump failure.

The pump may comprise a tube through which the displacement rod passes with clearance and the tube defining one or more gaps adjacent to the seal means, forming the guide means for passage of pumped fluid but otherwise isolating the internal displacement chamber from the outlet.

One end of the tube may comprise a plurality of projections which space the end of the tube from the seal means, the gaps being defined between the projections. The projections may abut the seal means, in which case the gaps are partially defined by the seal means.

The other end of the tube may comprise an annular portion which engages the outer surface of the displacement rod. This may act as a scraper to discourage the build-up of unwanted deposits on the rod. The tube may comprise one or more apertures which allow passage into the tube of fluid to be pumped when the displacement rod is actuated.

In accordance with a seventh aspect of the present invention, a fluid pump comprises a housing having an internal displacement chamber, an inlet, an outlet, a displacement rod which passes reciprocally into the displacement chamber and seal means which engage the outer surface of the displacement rod and define a boundary of the displacement chamber, the displacement rod comprising a resiliently deformable sleeve or coating and the seal means being substantially rigid, the pump further comprising a scraper means outwardly of the seal means which comprises one or more edges for scraping unwanted deposits off the resiliently deformable sleeve or coating of the displacement rod.

Preferably, the scraper means comprises a tube having a plurality of apertures therein, the periphery of the apertures being formed into scraper edges.

Preferably, the diameter of the tube is smaller than the outer diameter of the displacement rod. This results in the resiliently deformable sleeve or casing bulging into the apertures, which enhances removal of unwanted deposits.

By way of example only, specific embodiments of the present invention will now be described, with reference to the accompanying drawings, in which.

Figure 1:
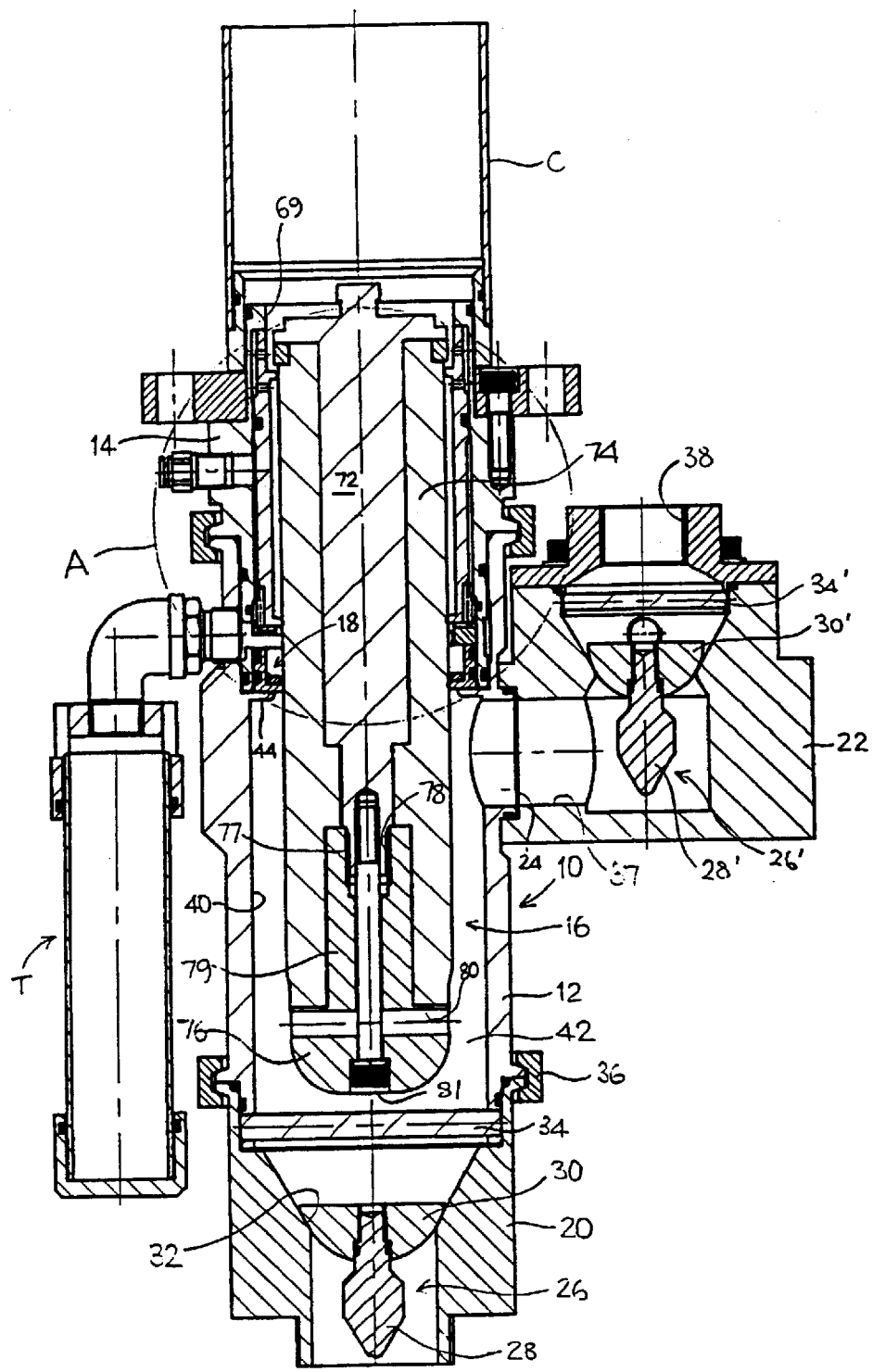
FIG. 1 is a longitudinal cross section through a first embodiment of pump in accordance with the present invention.
Figure 13:
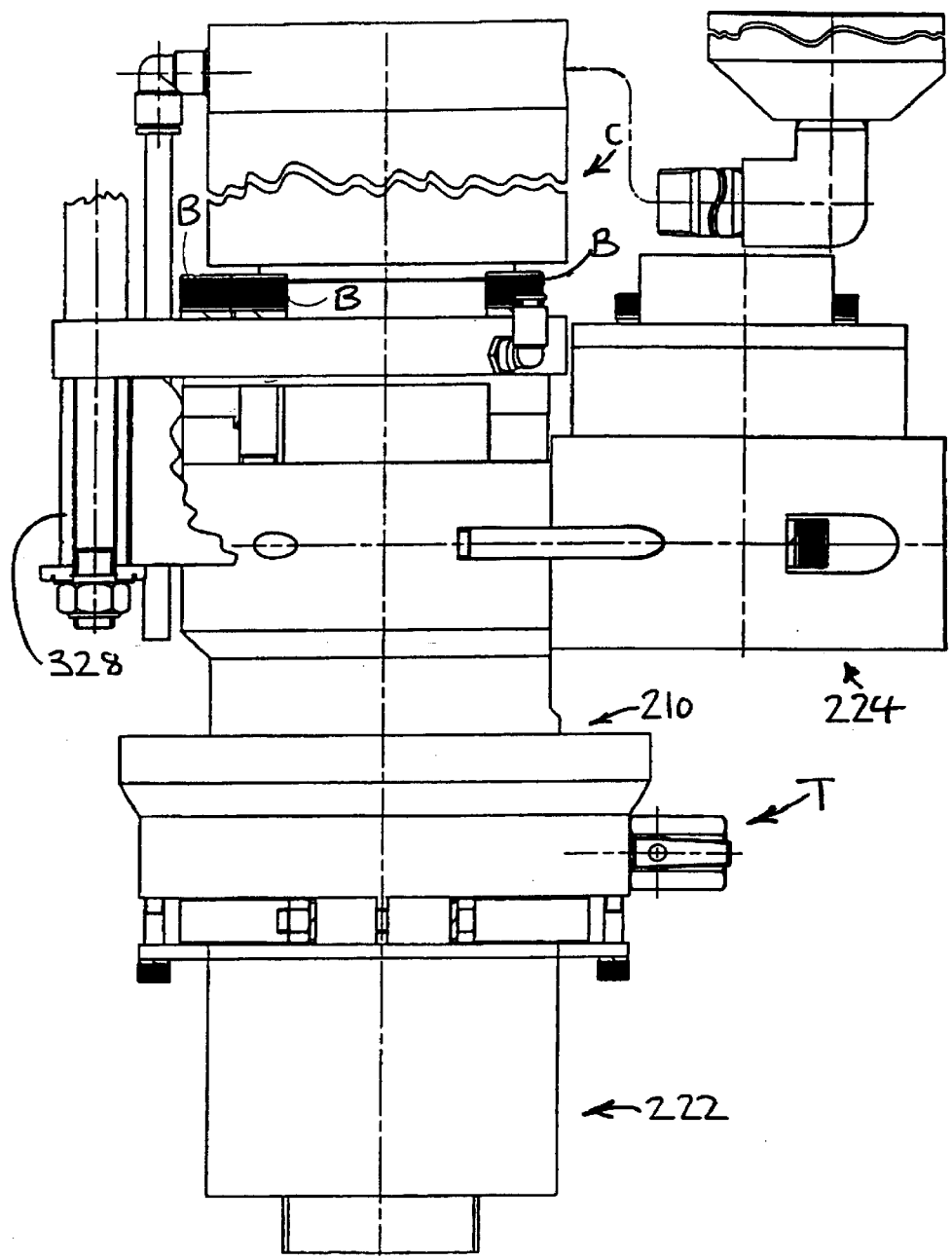
Figure 14:
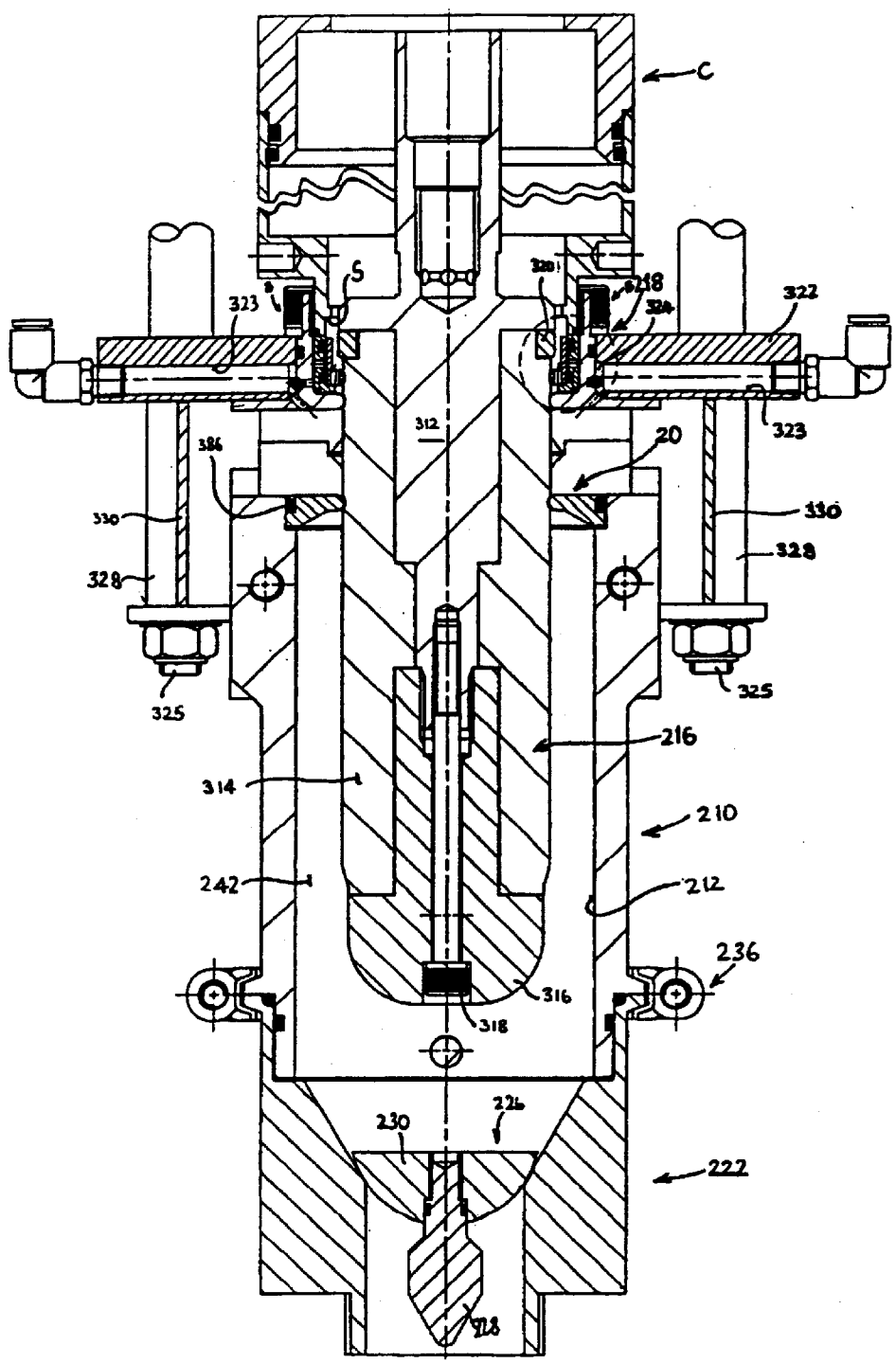
Figure 15:
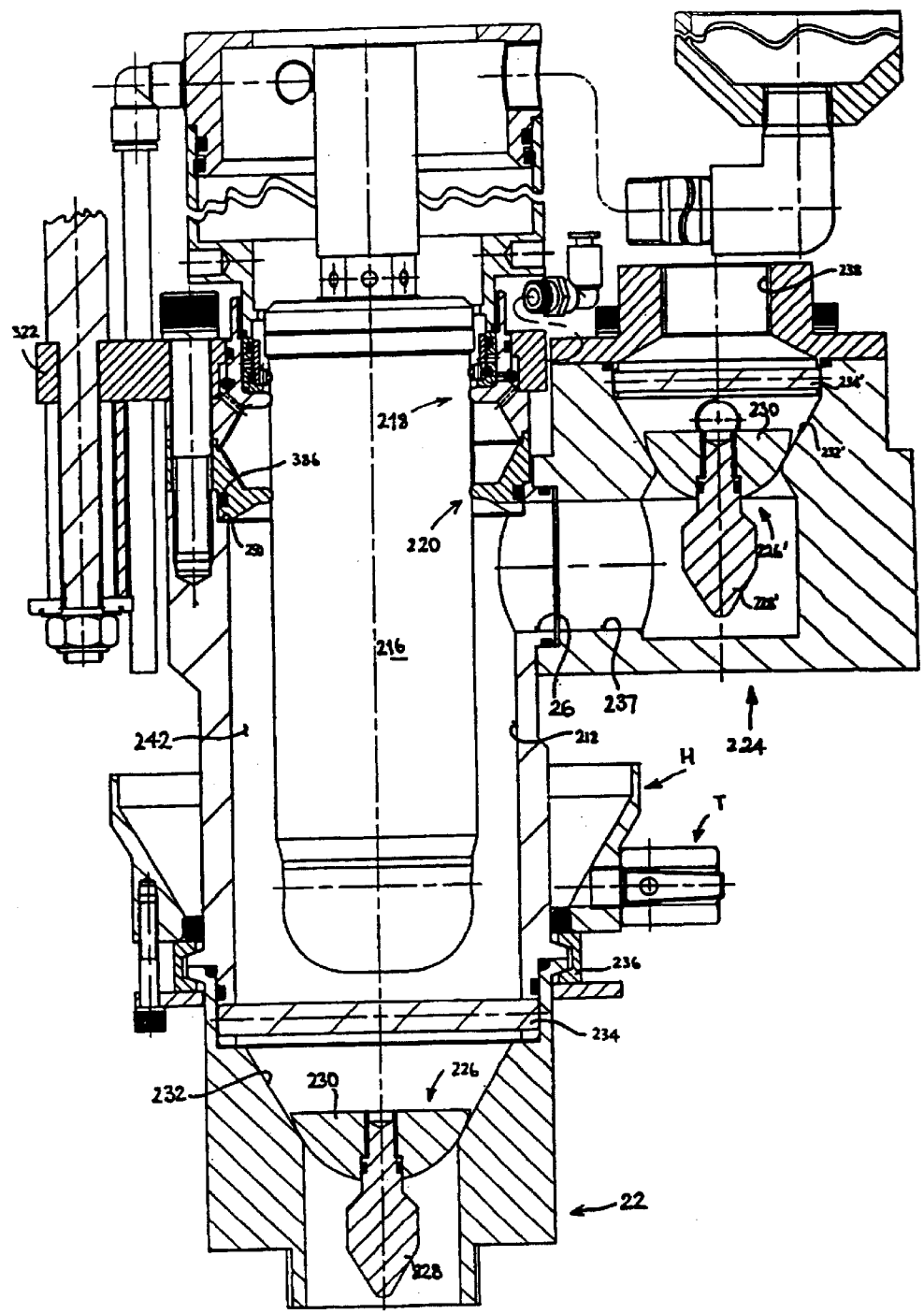
Figure 16:
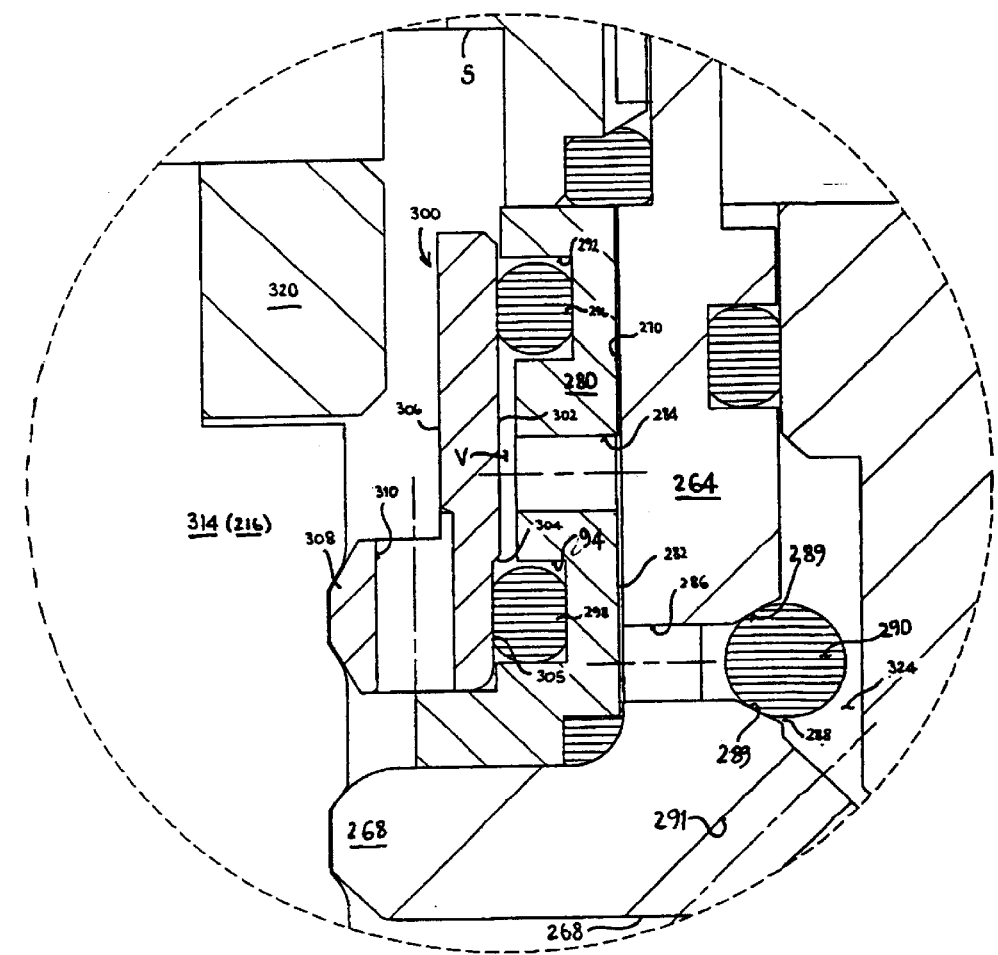
Figure 17A:
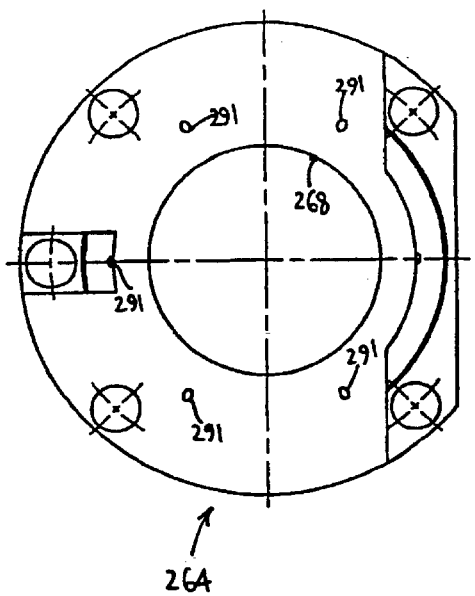
Figure 17B:
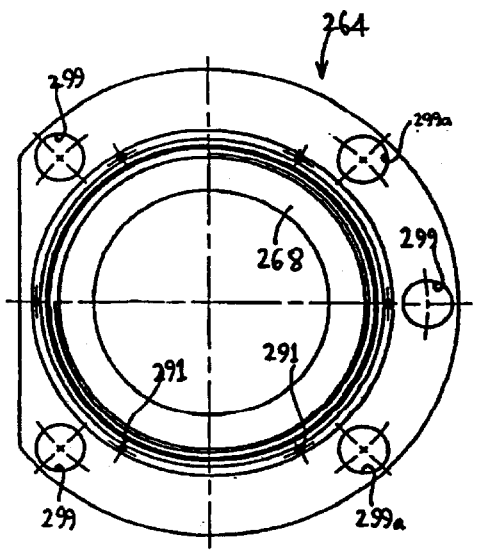
Figure 17C:
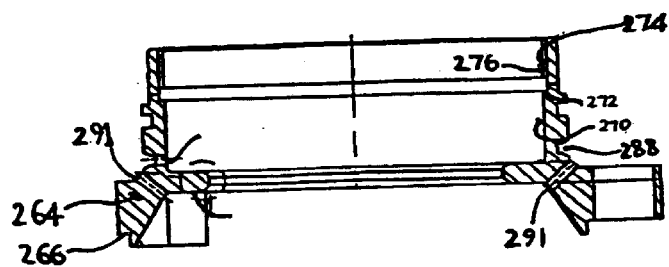
Figure 18A:
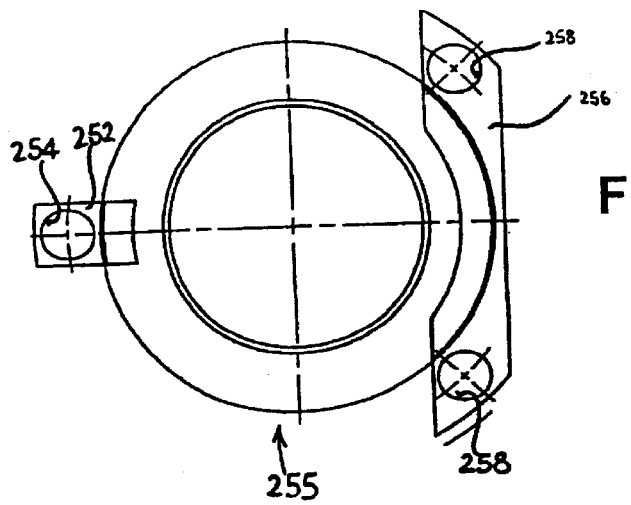
Figure 18B:
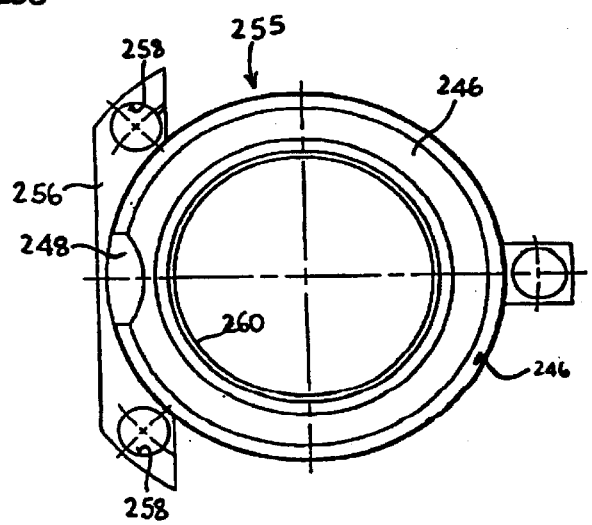
Figure 18C:
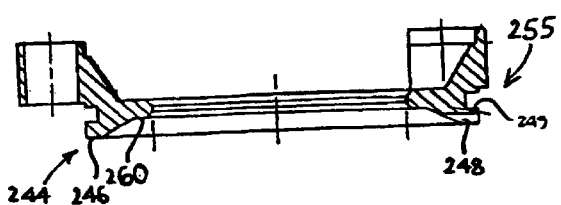
Figure 19A:
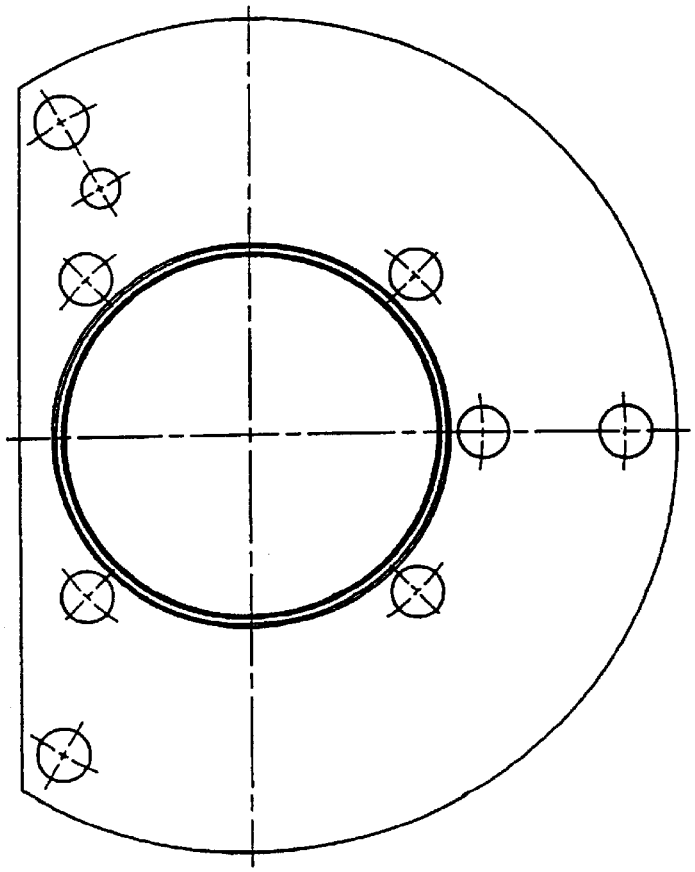
Figure 19B:
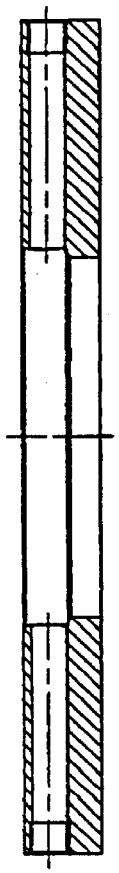
Figure 21:
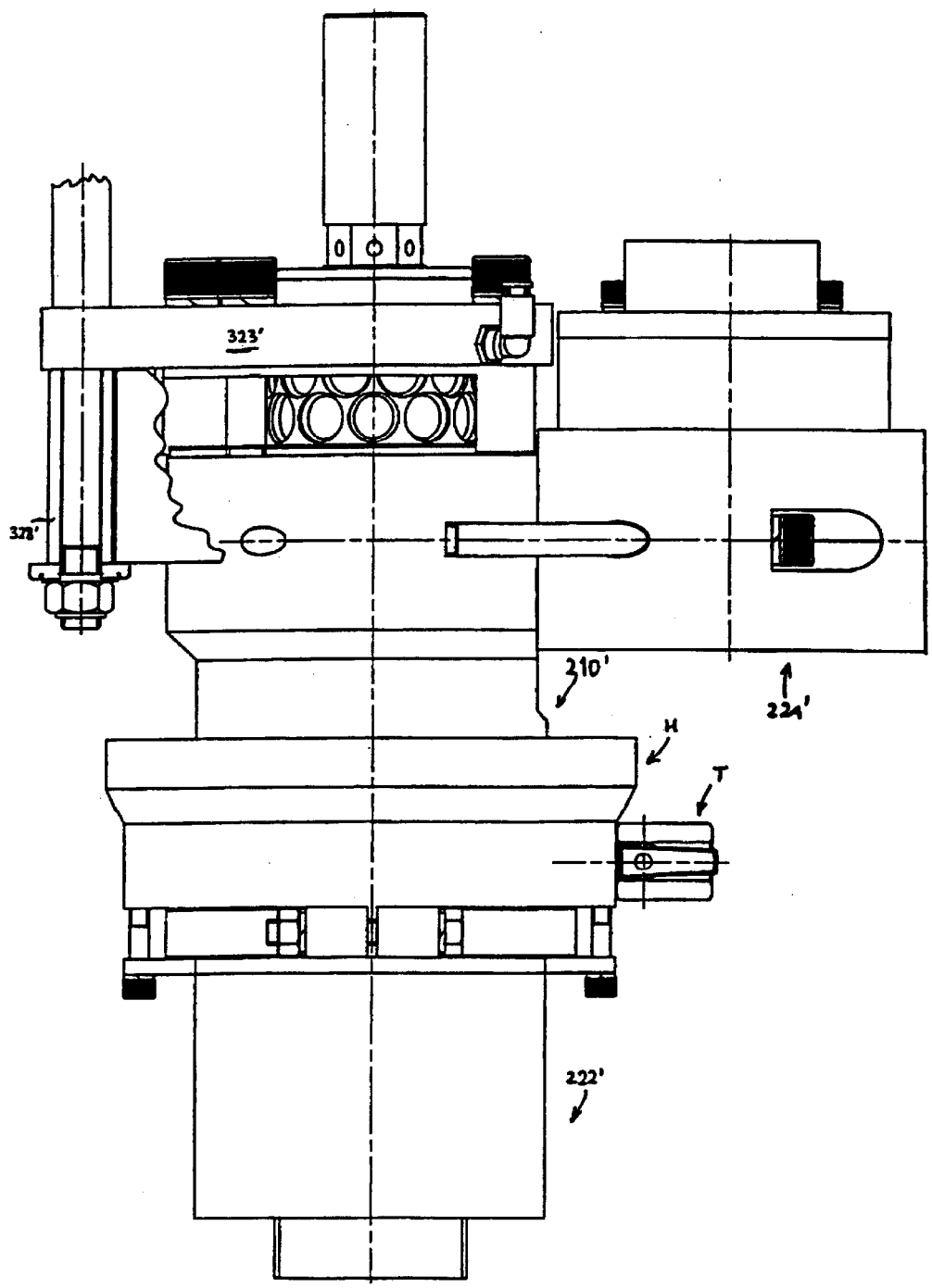
Figure 22:
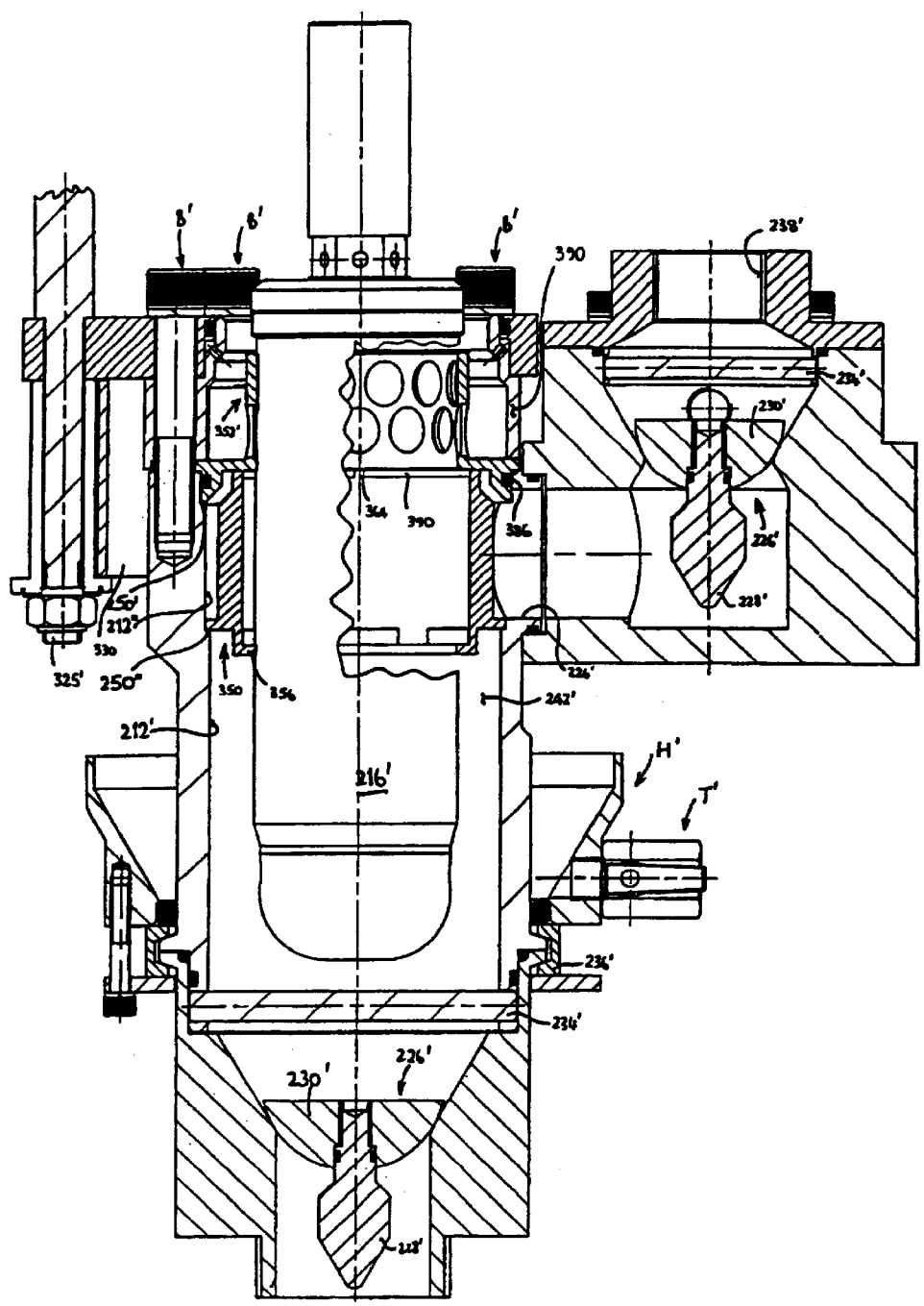
Figure 23:
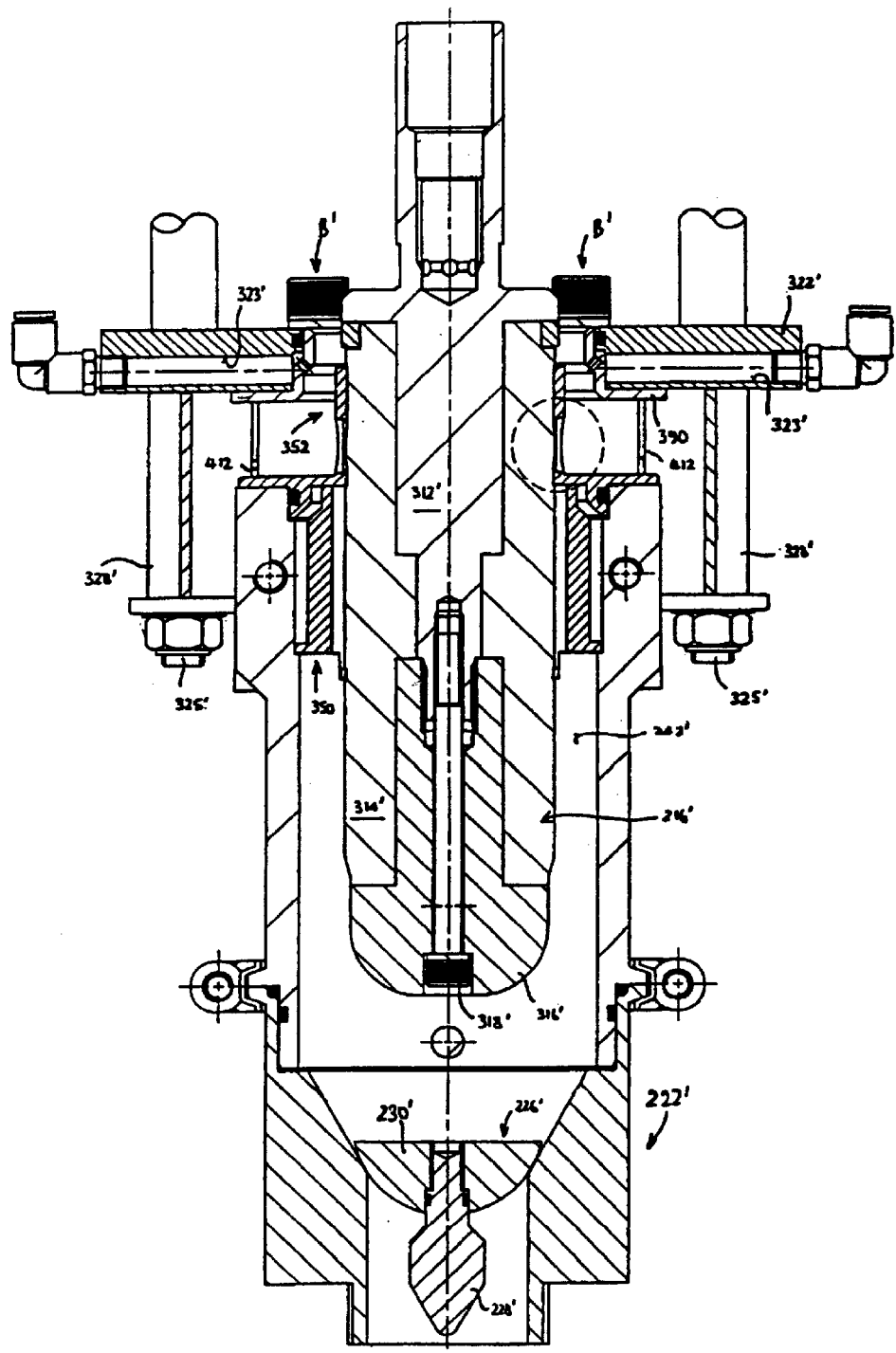
Figure 24A:
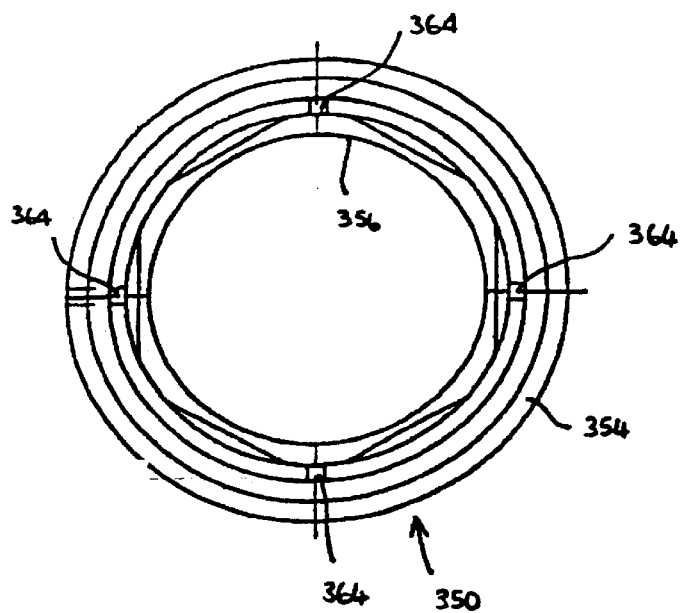
Figure 24B:
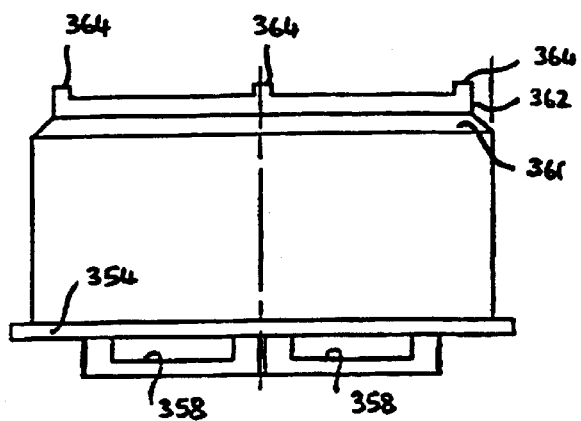
Figure 24C:
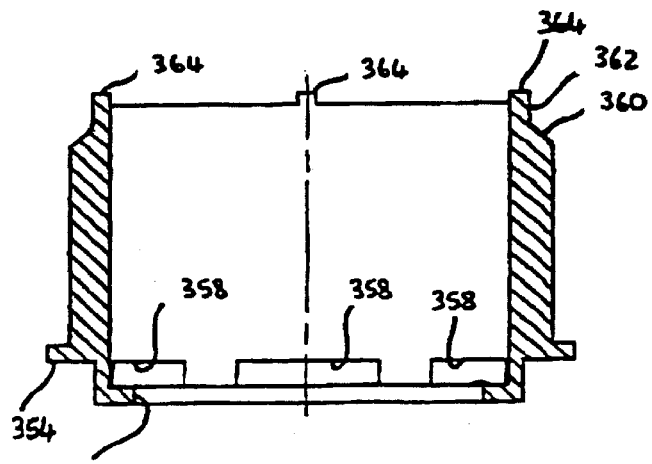
Figure 25A:
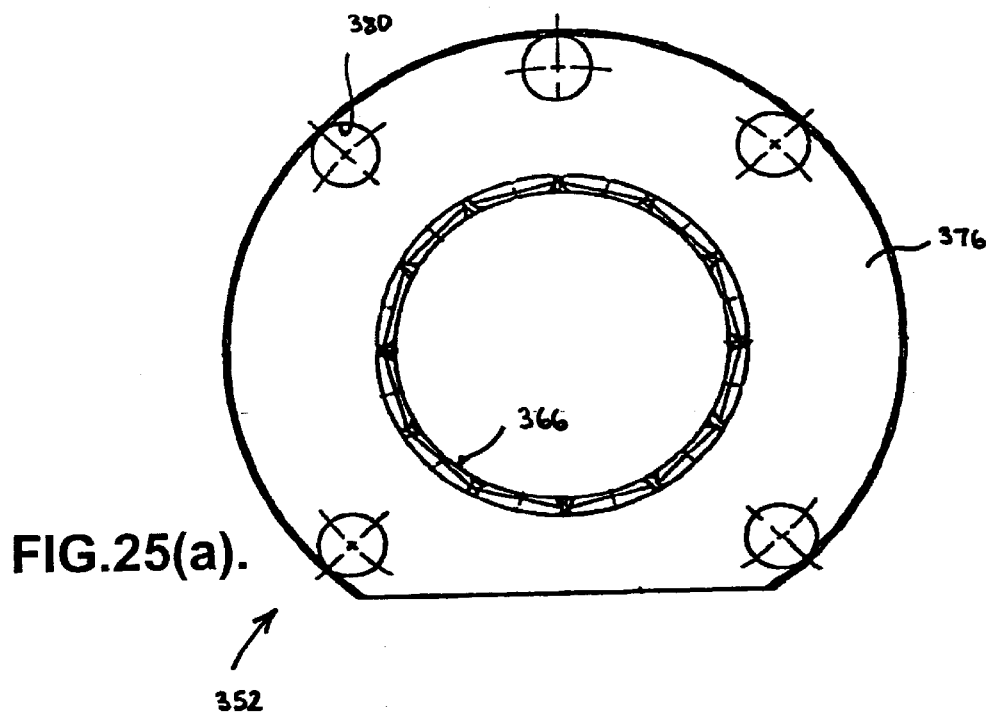
Figure 25B:
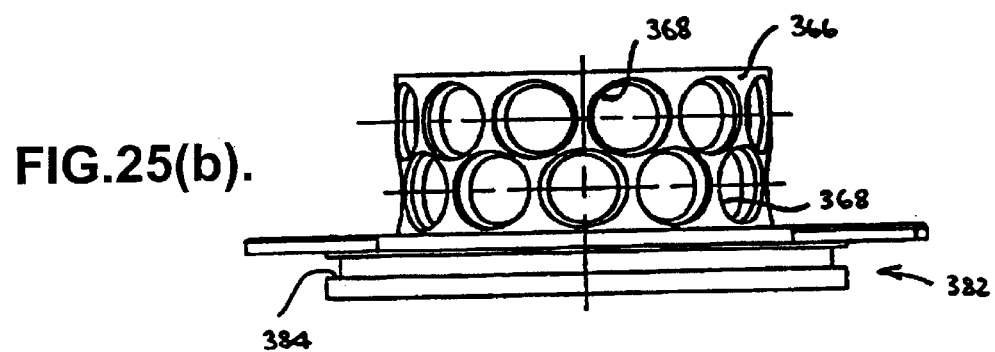
Figure 25C:
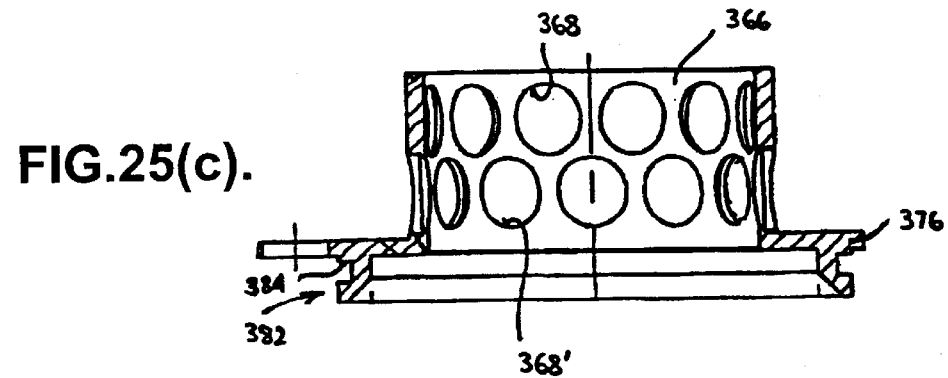
Figure 26:
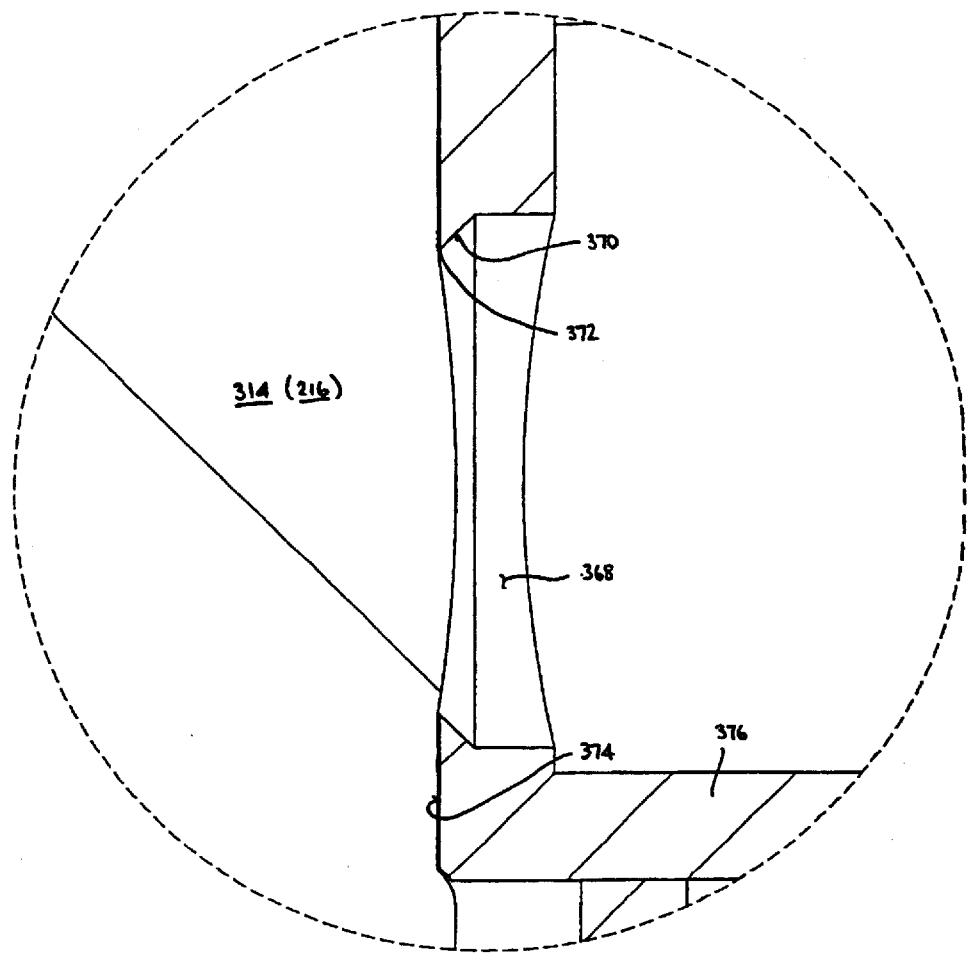

By way of example only, specific embodiments of the present invention will now be described with reference to the accompanying drawings, in which:

FIG. 13 is a side view, partly cut-away, of a further embodiment of pump in accordance with the present invention;

FIG. 14 is a vertical transverse cross-section through the pump illustrated in FIG. 13;

FIG. 15 is a further vertical cross-section through the pump illustrated in FIG. 1, in a plane inclined to that of FIG. 14;

FIG. 16 is an enlarged cross-sectional view of the ringed area in FIG. 14;

FIGS. 17a, 17b and 17c are a plan view, inverted plan view and vertical cross-section respectively through an upper seal ring of the pump of FIG. 13;

FIGS. 18a, 18b and 18c are a plan view, inverted plan view and vertical cross-section respectively through a lower seal ring of the pump of FIG. 13;

FIGS. 19a and 19b are a plan view and a transverse cross-section respectively of a mounting plate forming part of the pump of FIG. 13;

FIGS. 20a, 20b and 20c are a side view, a longitudinal cross-section and an end view respectively of a spacer collar forming part of the pump of FIG. 13;

FIG. 21 is a side view, partly cut-away of a yet further embodiment of pump in-accordance with the present invention;

FIG. 22 is a first vertical cross-section through the pump of FIG. 21;

FIG. 23 is a second vertical cross-section through the pump of FIG. 21;

FIGS. 24a, 24b and 24c are plan view, side view and longitudinal section respectively of an internal scraper of the pump of FIG. 21;

FIGS. 25a, 25b and 25c are a section plan view, side view and longitudinal cross-section of a seal ring of the pump of FIG. 21;

FIG. 26 is an enlarged view of the ringed portion in FIG. 23; and

Figure 27A:
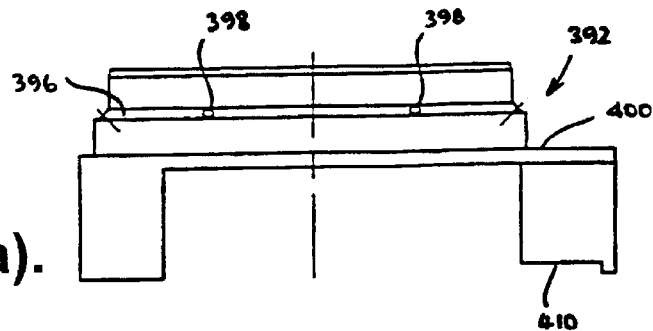
Figure 27B:
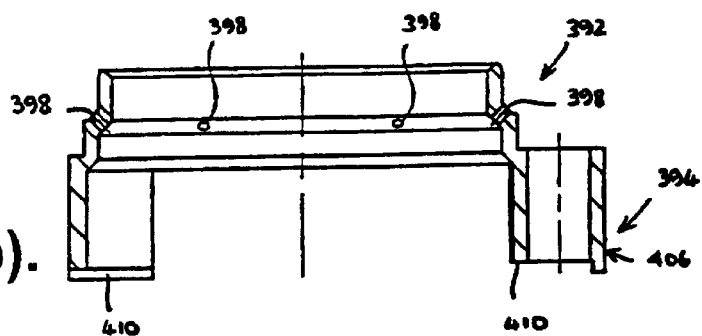
Figure 27C:
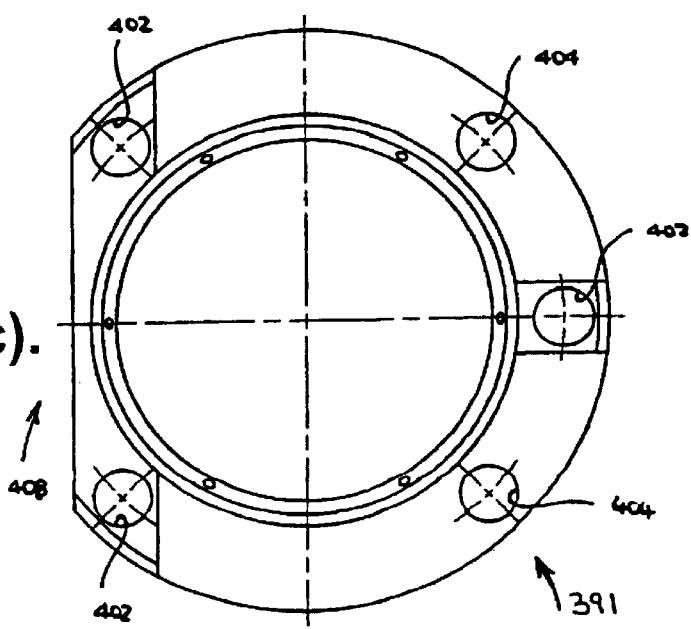

FIGS. 27a, 27b and 27c are a side view, transverse cross-section and inverted plan view respectively of a mounting plate support of the pump of FIG. 21.

Referring firstly to FIGS. 1 to 4, the pump assembly comprises a pump housing 10, formed from a generally tubular lower housing portion 12 and a generally tubular upper housing portion 14, is open at one end and a displacement rod 16 is reciprocable into and out of the housing through the open end by means of a pump actuator (not illustrated). A conventional chamber C containing a solvent or lubricant (or a mixture of the two) is also secured over the open end of the upper housing portion 14 for supplying fluid to the displacement rod in order to minimise the likelihood of seizure of the pump by hardened ink.

The displacement rod 16 is sealed with respect to the housing by means of a seal assembly 18 which will be discussed in more detail later. An inlet valve housing 20 is secured to the lower end of the lower housing portion 12 and an outlet valve housing 22 is secured to the side wall of the lower housing portion 12 and communicates with the interior of the housing by means of a port 24 in the housing wall.

The inlet valve 20 is very similar to that described in EP-A-0677658 and comprises a valve closure member 26 formed from a metal bob weight 28 and a flat-faced part-spherical plastics head 30 secured to the bob weight 28 which is sealingly engageable with a frusto-conical valve seat 32 within the inlet valve housing 20. The maximum displacement of the valve closure member 26 from the valve seat 32 is limited by means of a pin 34 extending diametrically across the valve housing and the valve housing 20 is secured to the lower housing portion 12 by means of an annular clamp 36.

The outlet valve 22 is very similar to the inlet valve 20 and similar reference numerals with the addition of a dash indicate corresponding features. It will be noted, however, that the outlet valve 22 has an inlet port 37 whose longitudinal axis extends radially with respect to the longitudinal axis of the displacement rod 16. The outlet valve 22 also has an outlet port 38 for conveying pumped fluid to the desired location.

It will be observed that between the seal assembly 18 and the inlet valve 20 a gap exists between the displacement rod 16 and the inner bore 40 of the housing 10, forming a pump working chamber 42. In a cycle of normal pump operation the displacement rod 16 is partially withdrawn from the working chamber 42, causing the valve closure member 26 of the inlet valve 20 to be lifted from its valve seat 32 and thereby drawing fluid into the pump working chamber. When the displacement rod 16 reaches its uppermost displacement and begins to move downwards in the opposite direction, the valve closure member 26 of the inlet valve 20 is reseated on the valve seat 32. This is assisted by the relatively large weight of the bob weight 28 which causes the valve to snap shut quickly. Further downward displacement of the displacement rod 16 increases the pressure in the working chamber 42 resulting in displacement of the outlet valve closure member 26' from its valve seat 32' and causing fluid within the working chamber 42 to be displaced through the outlet valve 22 and out of the outlet 38.

The operation of the valve is thus conventional. However, the manner of producing a seal around the displacement rod 16 as it moves is significantly different, as will be explained in more detail.

Referring to the construction of the main housing 10 in more detail, the lower housing portion 12, as mentioned above, is generally tubular and the first cylindrical bore 40 defines the pump working chamber 42. A radially inwardly directed annular shoulder 44 is also provided to support the sealing arrangement 18 and a larger diameter internal bore 48 is formed in the lower housing portion on the opposite side of the shoulder 44 from the first bore 40. The lower housing portion 12 is also provided with three radially extending outlet ports 50 in the side wall, equally angularly spaced around the periphery of the wall in the vicinity of the sealing arrangement 18 An ink collection tube T may be connected to each of the three ports 50. Only one tube T has been shown in FIG. 1 and the tube T has been omitted from FIGS. 2 to 4, for purposes of clarity.

The upper portion 14 of the housing is also generally tubular and is provided with a lower tubular portion 52 which is sealingly received in the uppermost portion of the bore 48 of the lower housing portion 12 and whose lowermost end is seated on or adjacent to the shoulder 44. The lower portion 12 and upper portion 14 are secured together by means of an annular clamping band 54 which clamps together aligned complementarily-shaped peripheral flanges 56, 58 on the two housing portions.

The upper housing portion 14 receives a locating and bearing sleeve 60 internally. The upper end of the sleeve 60 is a sealing fit within the bore of the housing portion 14 but the middle portion of the locating and bearing sleeve 60 is of a slightly smaller external diameter whereby an annular gap 62 exists between the inner bore of the upper housing member 14 and the outer surface of the locating sleeve 60. The lowermost portion of the sleeve 60 is of increased external diameter and is received in the lowermost portion of the lower tubular portion 52 of the upper housing member 14 which is of increased internal diameter. An O-ring seal 61 provides a sealing contact between the sleeve 60 and the tubular portion 52 of the upper housing member 14.

The upper housing portion 14 is also supplied with pressurised air via a radially-extending inlet port 64 which communicates with the annular gap 62 between the locating sleeve 60 and the inner surface of the upper housing member 14. By means of a series of bores 66 (FIG. 2) extending in the longitudinal direction of the pump in the lower portions of the locating sleeve 60 the pressurised air is supplied to the sealing arrangement 18, as will be explained.

The upper end of the locating and bearing sleeve 60 is formed into a radially inwardly directed annular bead 67 of a diameter substantially equal to the external diameter of the displacement rod 16, forming a bearing and guide for the displacement rod 16. A plurality of holes 68, 70 is provided above and below the bead 67 around the periphery of the locating and bearing sleeve 60. The sleeve 60 is held in position within the upper housing portion by an inturned annular shoulder 69 at the upper end of the upper housing portion 14.

The displacement rod 16 comprises an elongate steel core 72 on which is located a resiliently deformable elastomeric tubular sleeve 74 formed from polyurethane. The sleeve is held in position on the core 72 by means of a mushroom-shaped stainless steel head 76 which is releasably attachable to the core by means of interengaging screw threads 77 on the internal surface of a recess 78 in the end of the shaft 79 of the head and on the external surface of the adjacent end of the core 72. A diametrically extending bore 80 passes through the opposite end of the head 76, for receipt of a bar for rotating the head with respect to the core 72. A securing bolt 81 passing along the shaft 79 of the head 76 into the steel core 72 has a screw thread of different pitch from that of the screw threads 77 and thus locks the head 76 in position on the core.

Figure 2:
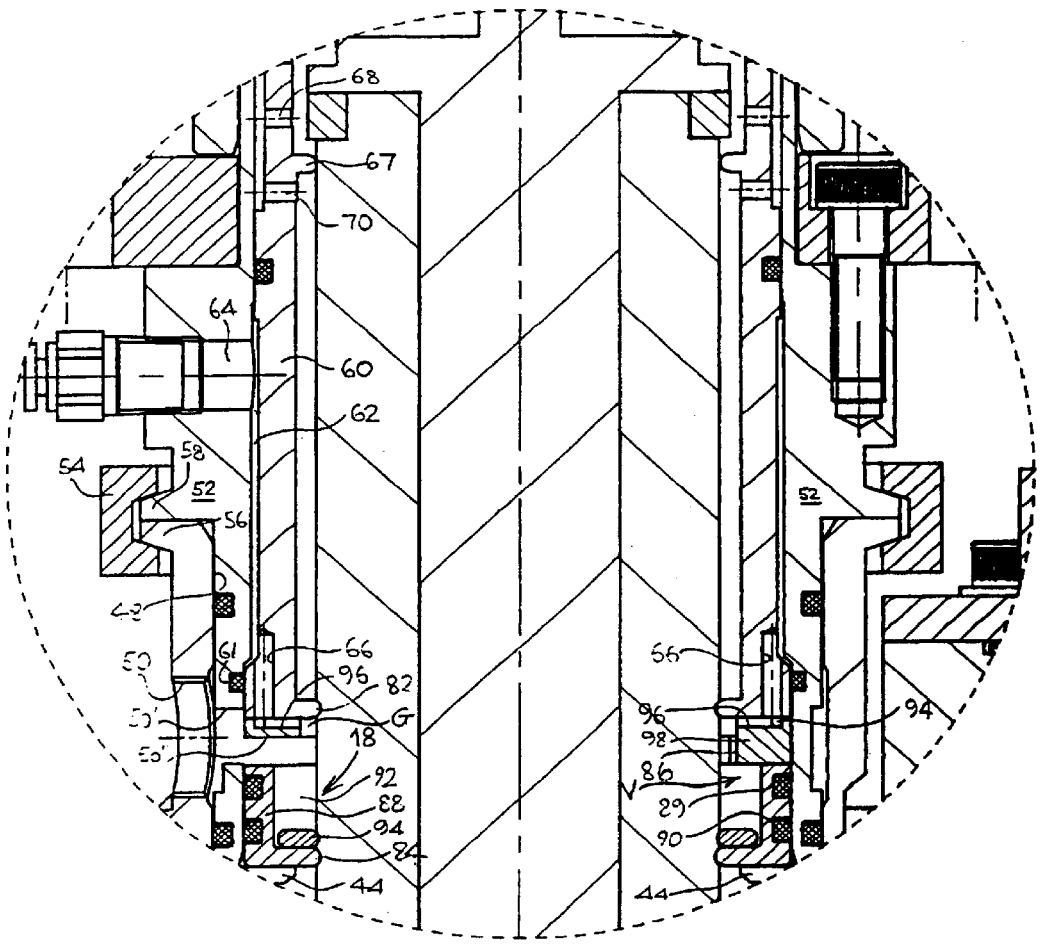
FIG. 2 is an enlarged view of portion A of the pump as shown in FIG. 1.
Figure 4:
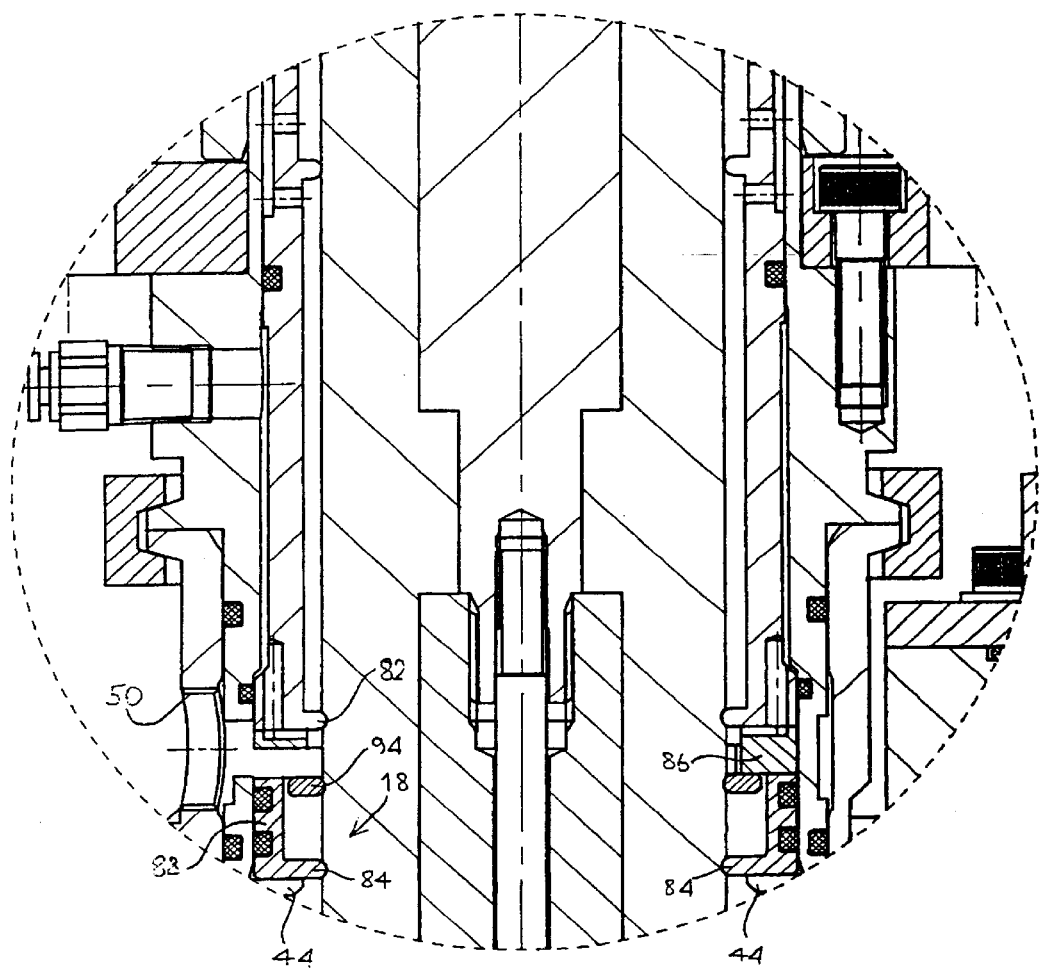
FIG. 4 is an enlarged view of the portion B of the pump as shown in FIG. 3.

As best seen in FIGS. 2 and 4 the sealing arrangement 18 comprises two radially inwardly-projecting annular lugs or beads 82, 84 located in the vicinity of the outlet ports 50. The diameter of the lugs 82, 84 is less than the external diameter of the displacement rod 16, with the effect that the polyurethane sleeve 74 is resiliently deformed inwardly by the beads 82, 84 in the contact region, thereby forming a seal between the two.

The upper seal 82 is formed as a radially inwardly-directed annular projection at the base of the locating and bearing sleeve 60, immediately above a spacer ring 86. The lower bead 84 is formed as a radially inwardly-directed annular extension at the lower end of a tubular stainless steel seal body 88. The seal body is sealed with respect to the inner bore of the upper housing portion 14 by rings of O-ring seals 89, 90.

The diameter of the bore of the seal body 88 is considerably greater than the external diameter of the displacement rod 16, thereby forming an annular gap 92 between the two. It will be observed, however, that a stainless steel floating washer 94 is located within the annular gap. The internal diameter of the washer is smaller than the external diameter of the displacement rod 16, whereby the region of the polyurethane sleeve upon which the washer is located is resiliently deformed.

Thus, the displacement rod 16 is sealed with respect to the housing by means of two line seals formed by the radially inwardly-directed annular beads 82, 84. It will also be observed that pressurised air fed from the inlet 64 makes its way via the annular gap 62 to the spacer ring 86. The spacer ring 86 is spaced from the displacement rod by a further annular gap G. Thus, an annular volume V (including the annular gaps 92 and G) exists around the rod 16 between the sealing beads 82, 84. The upper surface of the spacer ring 86 is provided with an annular recess 94 which communicates with the plurality of bores 66 in the sleeve 60 and a plurality of radial slots 96 in the upper surface of the spacer ring 86 connect the annular recess 94 in the upper face of the ring to the annular gap G and thereby to the volume V. The spacer ring engages the lowermost end of the sleeve 60 but air is allowed to flow through the annular gap 62 and the bores 66 in the sleeve and the annular recess 94 and the radial slots 96 into the annular volume V into the area adjacent to the sealing beads 82, 84. The upper housing portion and the spacer ring 86 are also each provided with three ports (50', 50") equally spaced around their periphery and aligned with the outlet ports 50 in the lower housing portion 12. The three ports 50" in the spacer ring are formed by three equally angularly spaced slots in the lower face which define three support legs 98 which contact the seal body 88 at locations other than the port areas 50". Thus, any ink which manages to make its way past the sealing bead 84 into the area between the sealing beads 82 and 84 will be flushed out of the valve by means of the high pressure air via the outlet ports in the housing.

Thus, any ink making its way past the sealing bead 84 will be flushed away to atmosphere and will not be able to pass sealing bead 82 into the bearing area of the displacement rod 16, which might otherwise cause severe problems.

Figure 3:
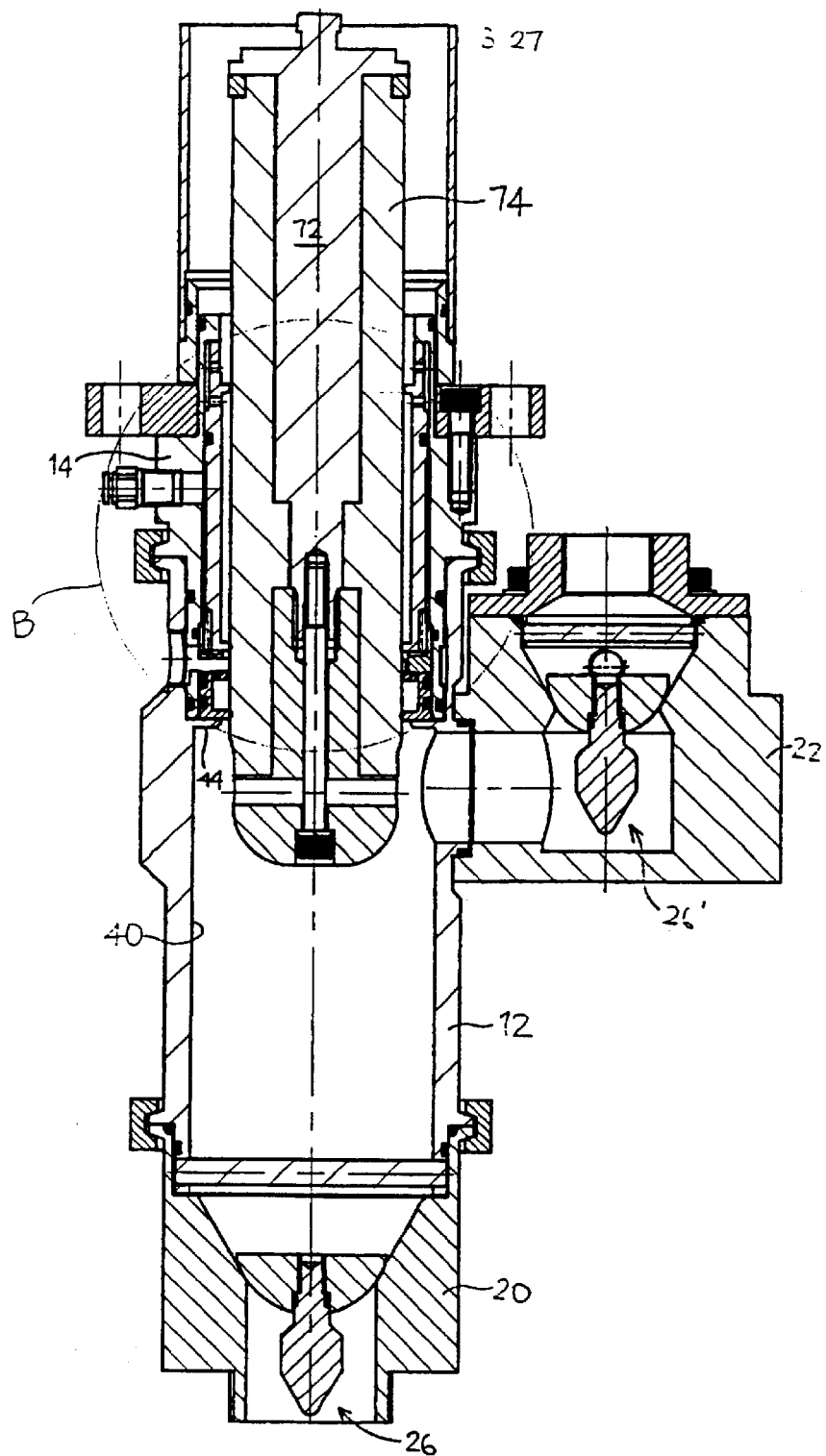
FIG. 3 is a longitudinal cross section through the pump of FIG. 1, in one extreme position.

The pump is operated conventionally and can be displaced between the extreme positions shown in FIGS. 1 and 3 respectively.

In the position shown in FIG. 1, the pump is at its lowermost position, in which position the washer 94 has been carried downwardly by the displacement rod 16 to its lowermost position, where it contacts the upper face of the inwardly-directed lower sealing bead 84.

As the displacement rod 16 is displaced upwardly, the washer is carried upwards by the movement of the displacement rod 16 until it abuts the undersurface of the spacer ring 86. The displacement rod 16 is then forced to move relative to the retained washer. The washer thus helps to remove any ink which may have made its way past the lower sealing bead 84, the ink then being exhausted through the exhaust ports 50.

Figure 5:
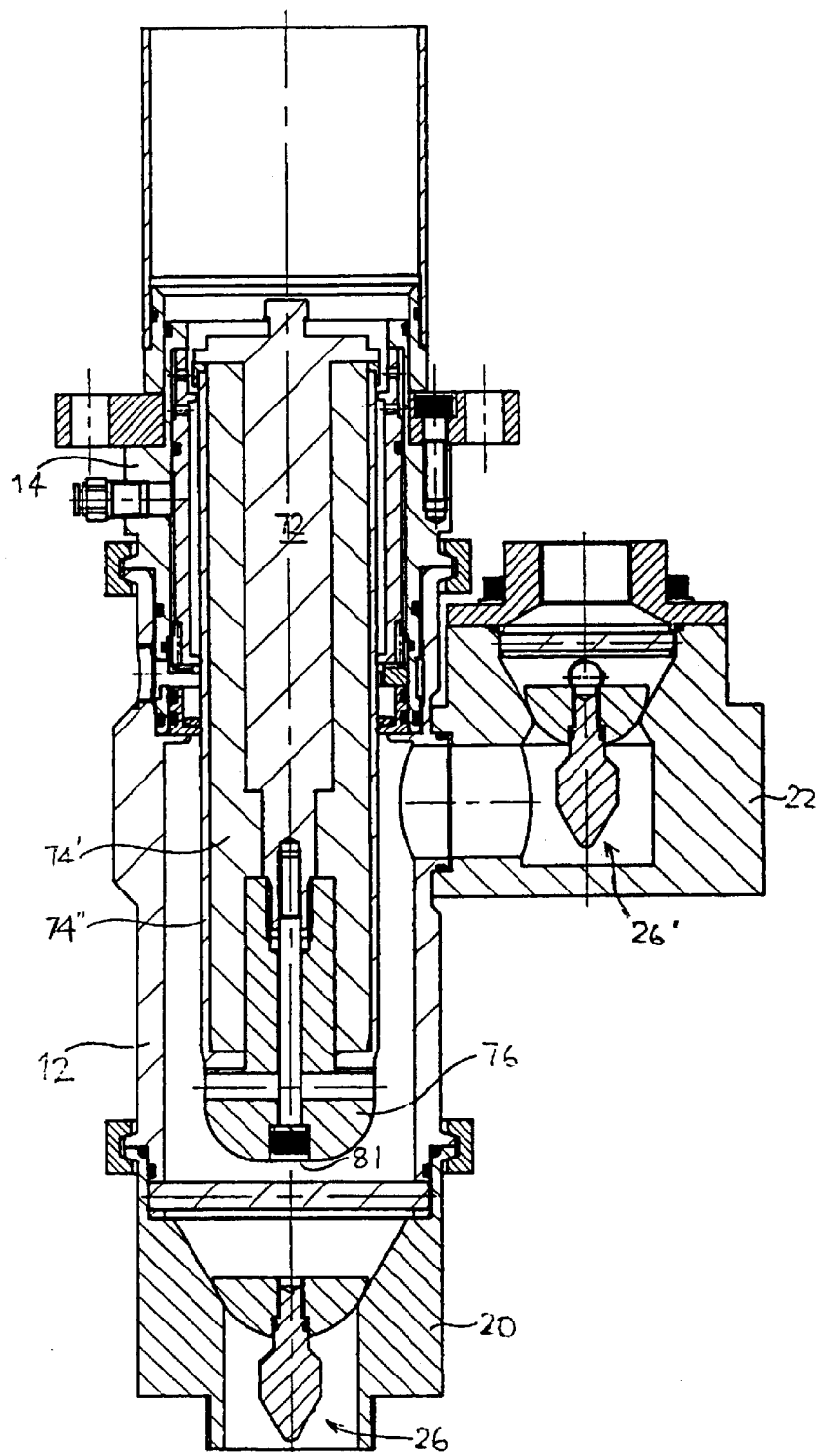
FIG. 5 is a longitudinal cross section through a second embodiment of pump in accordance with the present invention.

A second embodiment of the invention is illustrated in FIG. 5. This embodiment is virtually identical to the first embodiment of FIGS. 1 to 4 and the same reference numerals are used to denote the same features. The only significant difference is that the sleeve of the first embodiment is replaced with a two-part sleeve comprising an inner polyurethane sleeve 74' and a thinner, outer sleeve 74" of a different material such as PTFE. The use of an elastomer core provides the required resilience, whereas the use of a resistant PTFE outer layer increases resistance to attack by chemicals within the pump. The construction and operation of the pump are otherwise identical to that of the first embodiment.

Figure 6:
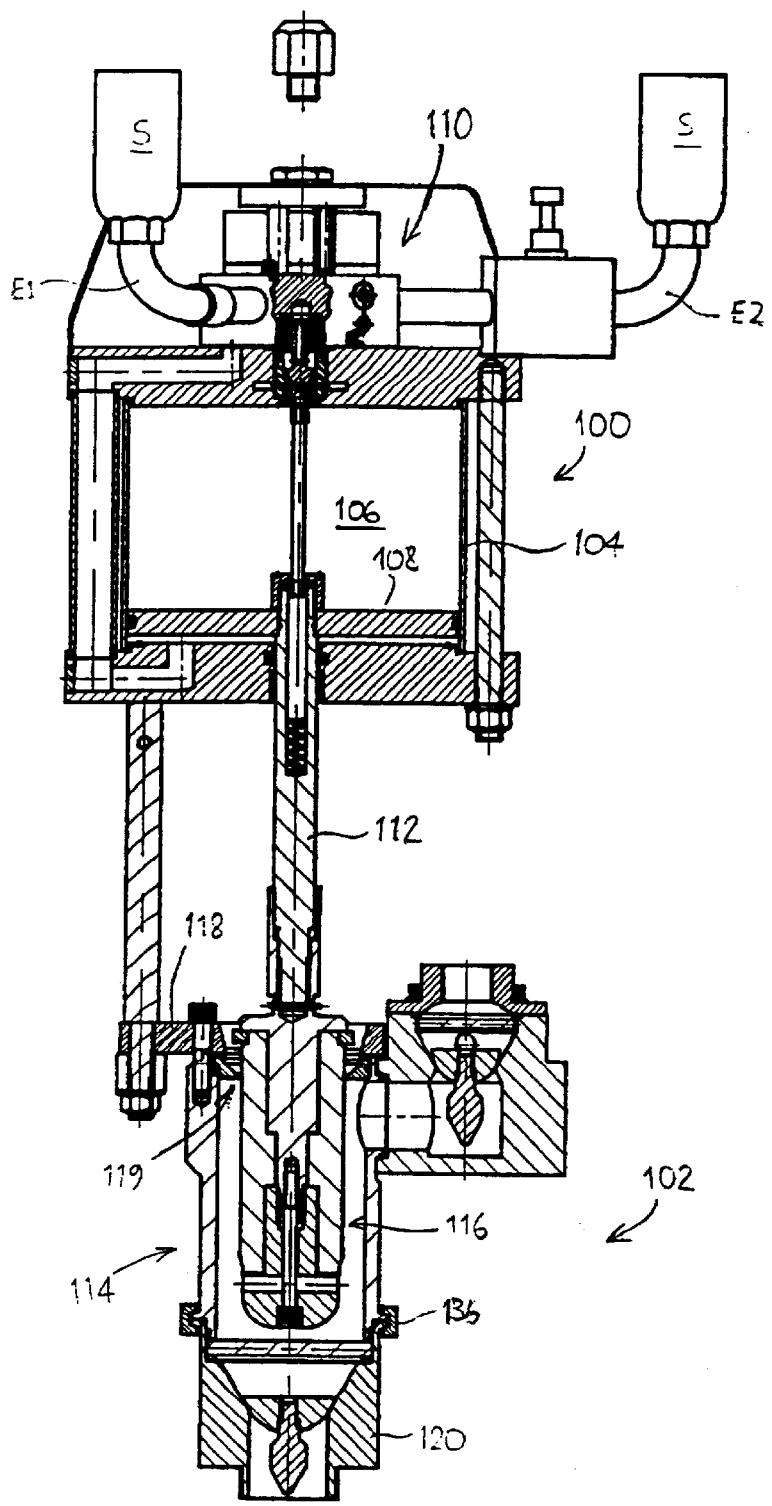
FIG. 6 is a longitudinal cross section through a third embodiment in accordance with the present invention.
Figure 7:
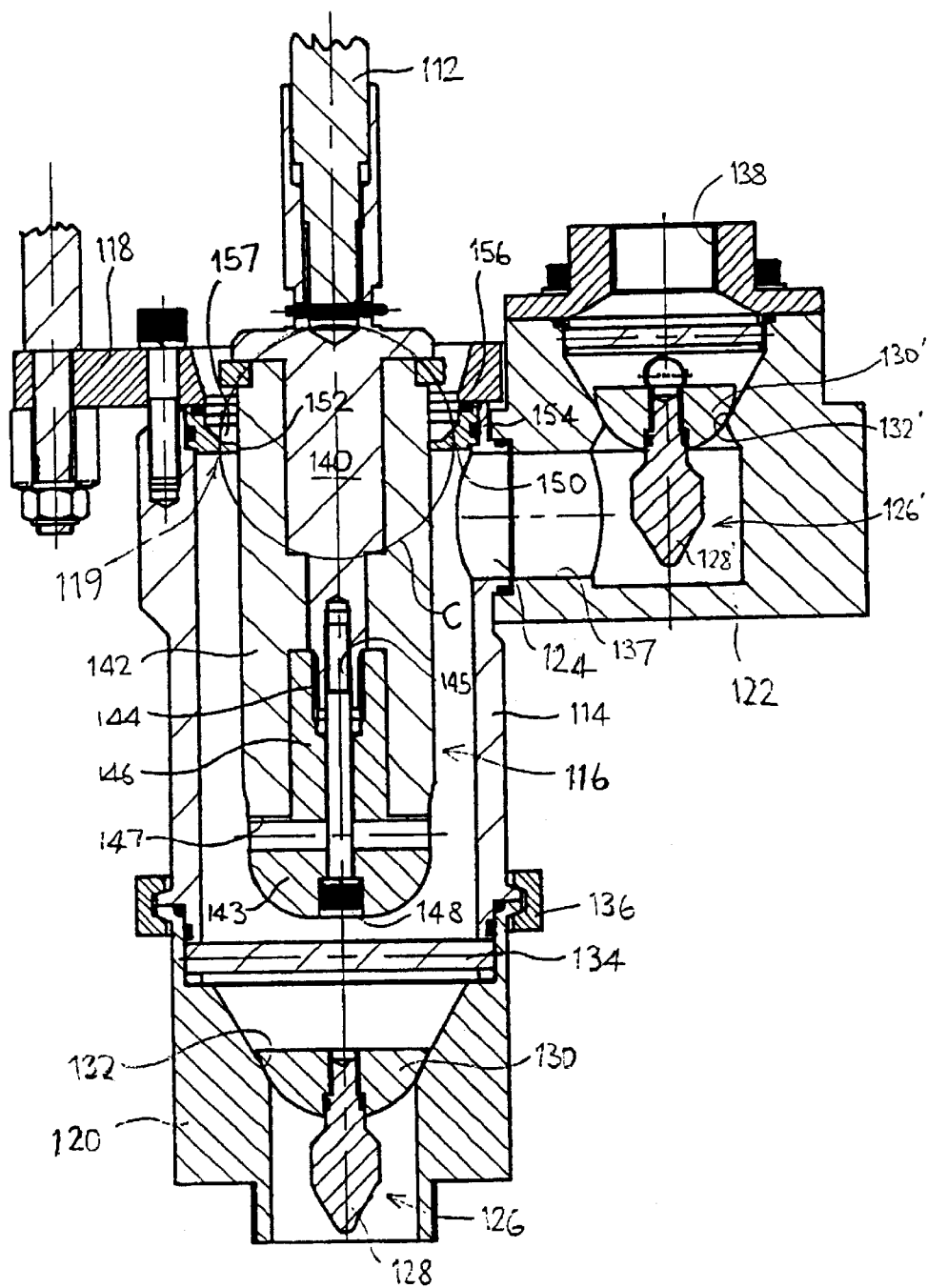
FIG. 7 is an enlarged cross-sectional view of the lower portion of the pump assembly as shown in FIG. 6.
Figure 8:
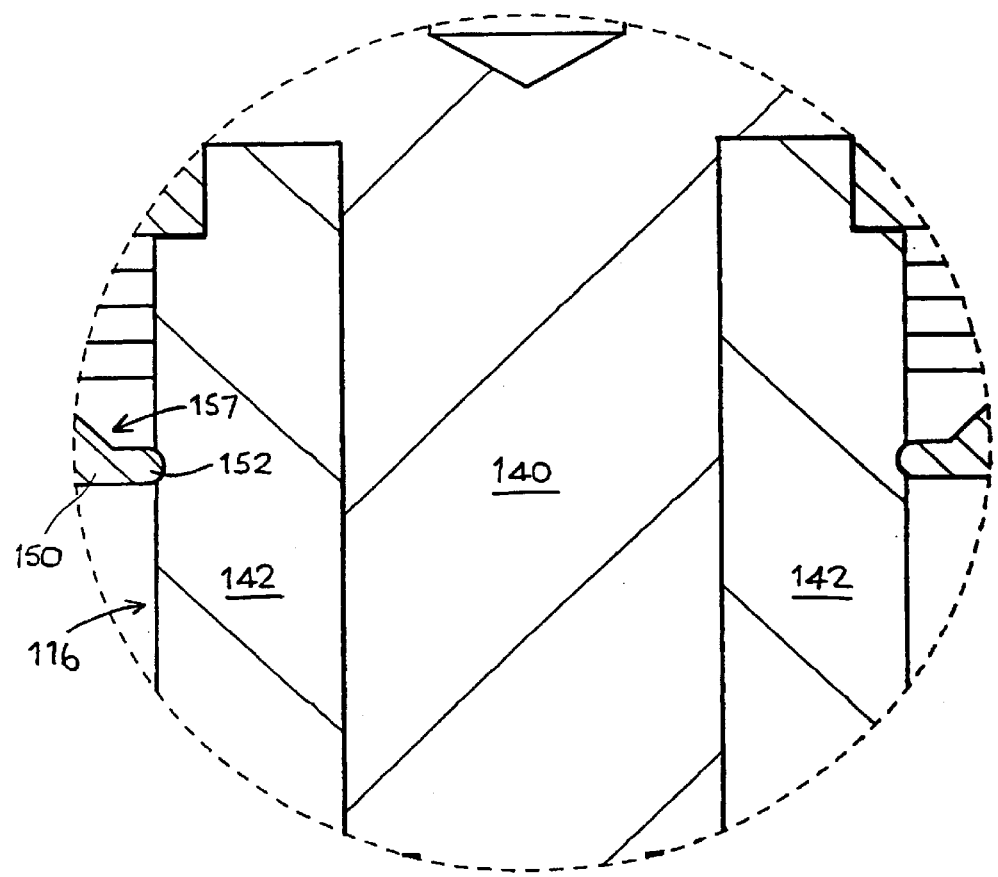
FIG. 8 is an enlarged view of portion C as shown in FIG. 7.

A third embodiment of the present invention is illustrated in FIGS. 6 to 8.

The pump illustrated in FIGS. 6 to 8 is generally conventional in construction and comprises a pneumatically-powered actuator 100 which is arranged to operate a pump assembly 102. The actuator 100 is generally conventional but, briefly comprises a housing 104 defining an internal chamber 106 within which a piston 108 is slidably and sealingly disposed. Pressurised air is fed via a valve assembly 110 alternately to opposite sides of the piston 108, which causes the piston to reciprocate within the chamber 106. A connecting rod 112 passing sealing out of the housing and is connected to a displacement rod 116 which forms part of the pump 102.

The pump 102 is a simplified version of that shown in the earlier embodiments. It comprises a generally tubular housing 114 open at one end through which the displacement rod 116 slides in a sealing manner. The displacement rod 116 is movable through an end cap 118 which houses a sealing assembly 119 as will be explained.

An inlet valve housing 120 is secured to the lower end of the main housing 114 and an outlet valve housing 122 is secured to the side wall of the main housing 114 and communicates with the interior of the housing by means of a port 124 in the wall of the main housing 114.

The inlet valve 120 comprises a valve closure member 126 formed from a metal bob weight 128 and a flat-faced part spherical plastics head 130 secured to the bob weight which is sealingly engageable with a frusto-conical valve seat 132 within the inlet valve housing 120. The maximum displacement of the valve closure member 126 from the valve seat 132 is limited by means of a pin 134 extending diametrically across the valve housing and the valve housing 120 is secured to the main housing 114 by means of an annular clamp 136.

The outlet valve 122 is very similar to the inlet valve 120 and similar reference numerals with the addition of a dash indicate corresponding features. It will be noted, however, that the outlet valve 122 has an inlet port 137 whose longitudinal axis extends radially with respect to the longitudinal axis of the displacement rod 116. The outlet valve 122 also has an outlet port 138 for conveying pumped fluid to the desired location.

As best seen in FIGS. 7 and 8, the displacement rod 116 comprises an elongate steel core 140 on which is located a tubular polyurethane sleeve 142. In an identical manner to the first embodiment, the sleeve is held in position on the core 140 by means of a mushroom-shaped stainless steel head 143 which is releasably attachable to the core by means of interengaging screw threads 144 on the internal surface of a recess 145 in the end of the shaft 146 of the head and on the external surface of the adjacent end of the core 140. A diametrically extending bore 147 passes through the opposite end of the head 143, for receipt of a bar for rotating the head with respect to the core 140. A securing bolt 148 passing along the shaft 146 of the head 143 into the steel core 140 has a screw thread of different pitch from that of the screw threads 144 and thus locks the head 143 in position on the core.

The seal assembly 119 comprises an annular, tubular seal body 150 having a radially inwardly-directed annular bead 152 whose diameter is less than the external diameter of the displacement rod, whereby the sleeve of the displacement rod is deformed radially inwardly at the region of contact. The seal body 150 is sealed with respect to the main housing 114 by means of an O-ring seal 154 and with respect to the end cap by means of an O-ring seal 156 in the end face of the body. It will also be observed that immediately above the radially inwardly-directed bead 152, the surface of the seal body is flared radially outwardly, to provide an annular "cup" 157 for containing a lubricant or solvent.

Operation of this embodiment is otherwise identical to that of the previous embodiments.

Figure 9:
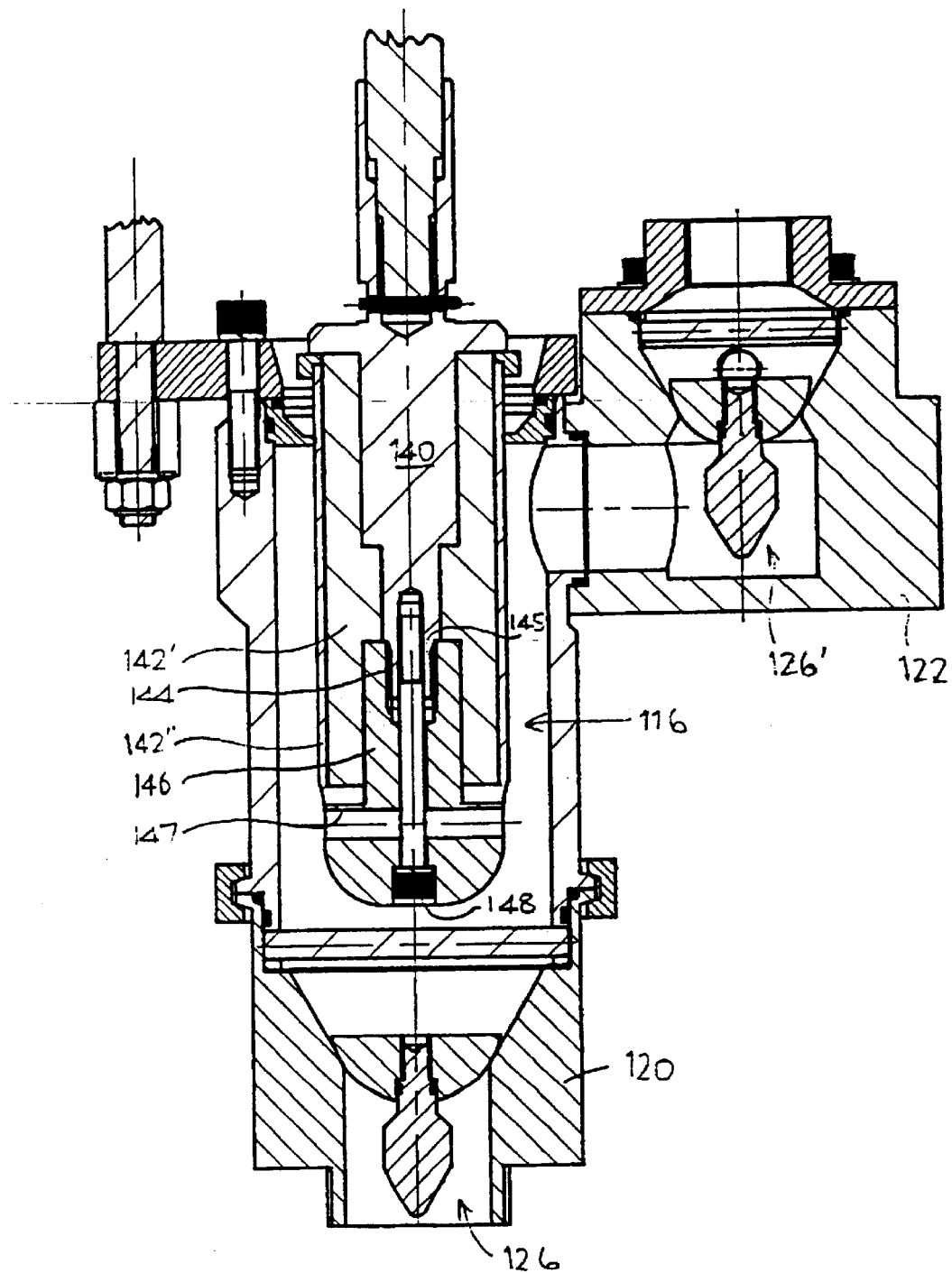
FIG. 9 is a longitudinal cross section through a third embodiment of pump in accordance with the present invention.

The embodiment of FIG. 9 is virtually identical to that of the previous embodiments, and the same reference numerals are used to denote the same features. The only significant difference is the use of a two-part sleeve, namely an inner elastomeric polyurethane sleeve 142' and an outer, thinner sleeve 142" made from PTFE or other resistant material. As for the second embodiment described previously, the inner sleeve provides the necessary resilience, whereas the outer sleeve provides improved chemical resistance.

Figure 10:
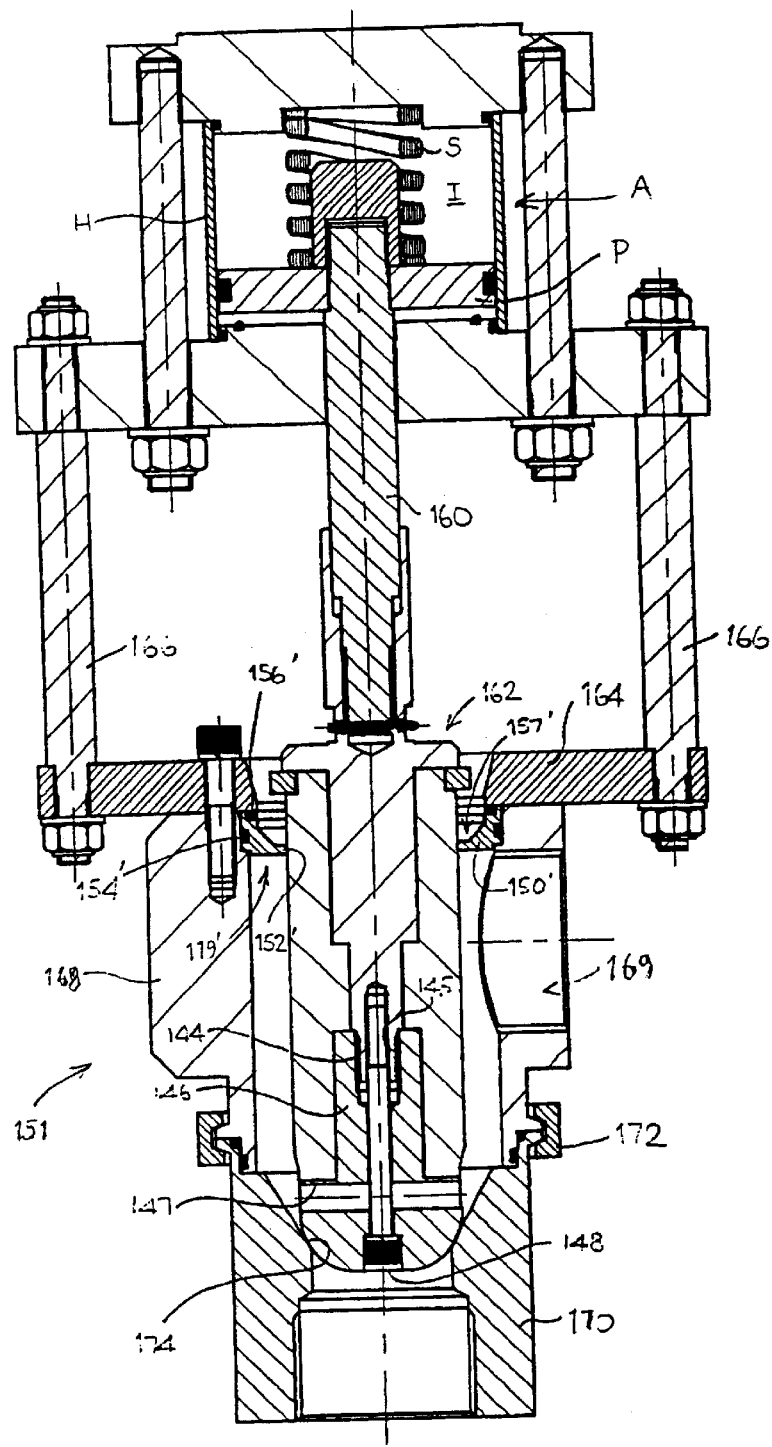
FIG. 10 is a longitudinal cross section through an embodiment of valve in accordance with the present invention.

A further embodiment of the present invention is shown in FIG. 10 which shows a valve assembly in accordance with the present invention. The valve assembly comprises a pneumatic actuator A and a valve 151. The actuator comprises a housing H defining an internal chamber I within which a piston P is slidably and sealingly disposed. Pressurised air can be fed to the undersurface of the piston which causes the piston to rise against the restoring force of a spring S within the chamber. When the pressurised air is removed, the restoring force of the spring S causes the piston P to move downwardly. The piston P is secured to a connecting rod 160 which passes sealingly out of the actuator and which is secured to a valve closure member 162 of the valve.

The valve 151 is mounted on a mounting plate 164 which is itself secured to the actuator by means of four support columns 166. The valve comprises a main housing portion 168 having an inlet port 169 in the housing wall and an outlet housing portion 170 secured to the main housing portion by means of an annular clamp 172. The housing encloses the valve closure member 162 which slidably and sealingly passes through an aperture in the mounting plate of the valve via a sealing arrangement 119'. The valve closure member is substantially identical to the displacement rod shown in the embodiment of FIGS. 6 to 8 and the same reference numerals are used to identify corresponding features. However in this embodiment the valve closure member does not act as a displacement rod. The head of the valve closure member is sealingly engageable with a frusto-conical valve seat 174 formed in the lower housing portion.

The sealing arrangement 119' is substantially identical to the sealing assembly 119 of the embodiment of FIGS. 6 to 8 and the same reference numerals with the addition of a dash are used to denote corresponding features. The seal arrangement thus comprises an annular, tubular seal body 150' having a radially inwardly-directed annular bead 152' whose diameter is less than the external diameter of the valve closure member, whereby the sleeve of the valve closure member is deformed radially inwardly at the region of contact. The seal body 150' is sealed with respect to the main housing 168 by means of an O-ring seal 154' and with respect to the mounting plate 164 by means of an O-ring seal 156' in the end face of the body. It will also be observed that immediately above the radially inwardly-directed bead 152', the surface of the seal body is flared radially outwardly, to provide an annular "cup" 157' for containing a lubricant or solvent if the valve is used in the vertical orientation shown in FIG. 10.

The valve is opened and closed by application and release of pressure to the actuator, as described previously, which causes the valve closure member to be lifted from or to sealingly engaged with, the frusto-conical valve seat in the lower valve housing portion.

Figure 11:
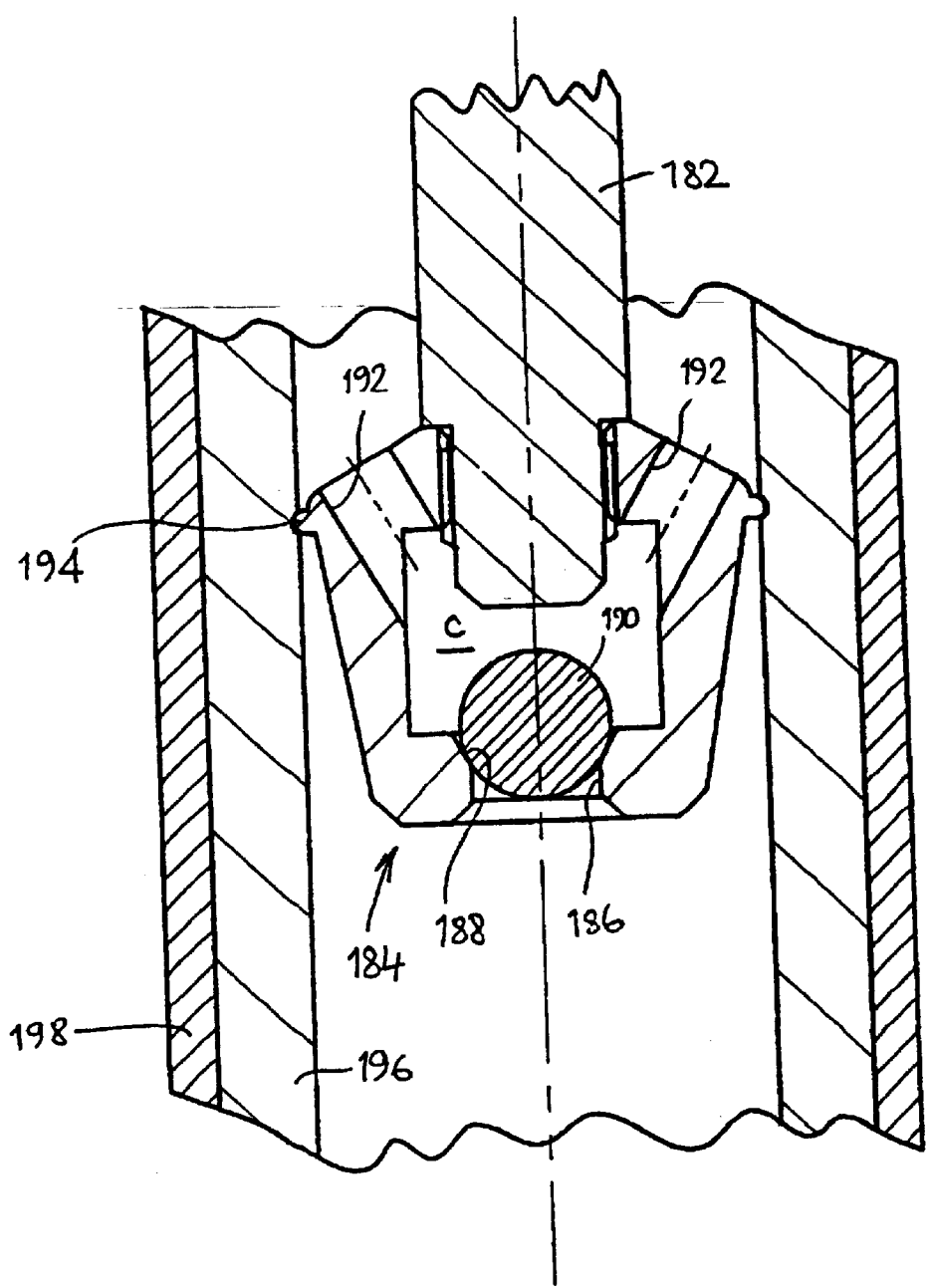
FIG. 11 is a longitudinal cross section through a portion of a further embodiment of pump in accordance with the present invention.

A further embodiment of the present invention is illustrated in FIG. 11. This comprises a piston which is slidably disposed in a cylinder. The piston forms part of a fluid pump for pumping fluid from a housing (not shown). The piston comprises a piston rod 182 to which is connected a piston head 184. The piston head is hollow and encloses an internal chamber C. The lowermost face of the head is provided with a through aperture 186, the inner portion of which is formed into a frusto-conical valve seat 188, with which a ball valve 190 is releasably engageable. A plurality of through apertures 192 is also provided in the opposite face of the piston, to allow the passage of fluid from the chamber C to the opposite side of the piston head.

The piston is also provided with a radially outwardly-projecting annular sealing bead 194, which is formed of the same material as the piston itself and integrally with the piston. The bead 194 is engaged with a tubular elastomeric polyurethane liner 196 of a cylinder 198 within which the piston is slidably disposed. The inner diameter of the liner 196 is smaller than the outer diameter of the sealing bead 194, whereby the liner is deformed in the area of the contact with the bead, thereby providing an efficient seal between the piston and the cylinder.

As the piston slides downwardly as shown in FIG. 11, fluid within the cylinder forces the ball valve 190 off its seat 188, which allows fluid to pass through the piston via the apertures 192 in the opposite end of the piston head. As the piston moves upwardly as shown in FIG. 11, the ball valve 190 is reseated on the frustoconical valve seat 188, which enables the piston to displace fluid located above the piston through an exit port (not shown) in the cylinder.

Figure 12:
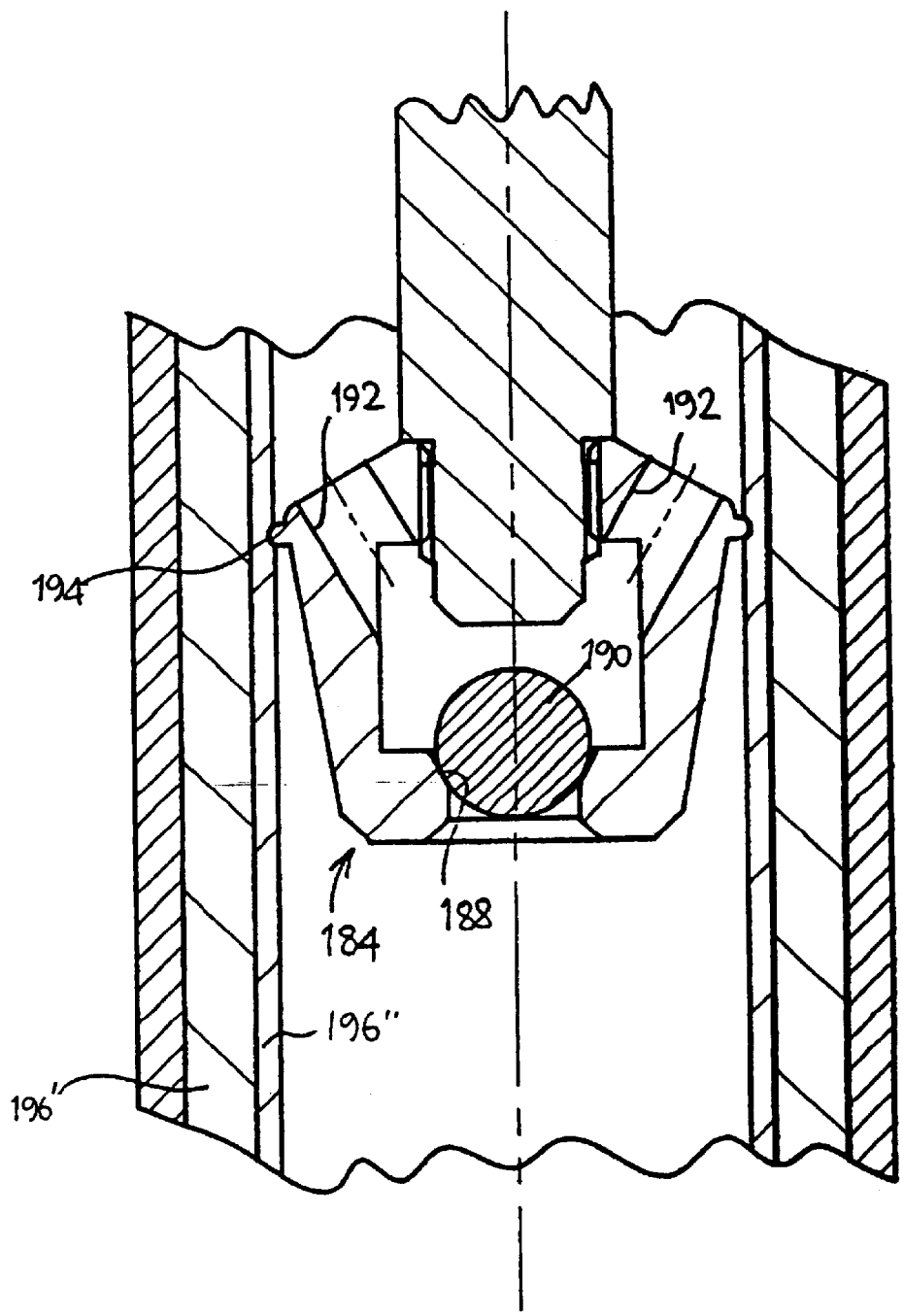
FIG. 12 is a longitudinal cross section through a portion of a further embodiment of pump in accordance with the present invention.

The embodiment shown in FIG. 12 is virtually identical to that of FIG. 11, and the same reference numerals are used to identify corresponding features. The only difference is that the liner of the cylinder is formed from two layers, an outer layer 196' of elastomeric polyurethane, to provide resilience, and an inner layer 196" of PTFE to provide increased chemical resistance.

Referring now to FIGS. 13 to 18, a further embodiment of pump comprises a generally tubular housing 210 having an internal cylindrical bore 212. The housing 210 is open at an upper end and a displacement rod 216 is reciprocable into and out of the housing through the open end by means of a conventional pneumatically operated pump actuator (not illustrated). The displacement rod 216 passes into the housing via sealing arrangement comprising upper and lower seal assemblies 218, 220. A cylindrical chamber C containing a solvent or lubricant (or a mixture of the two) is secured over the upper end of the upper seal assembly 218 for supplying fluid to the displacement rod in order to minimise the likelihood of failure of the pump resulting from hardened ink deposited on the rod.

An inlet valve housing 222 is secured to the lower end of the tubular housing 210 and an outlet valve housing 224 is secured to the side wall of the upper part of the housing 210 and communicates with the interior of the housing by means of a port 226 in the housing wall.

The inlet valve 222 is very similar to that described in EP-A-0677658 and comprises a valve closure member 226 formed from a metal bob weight 228 and a flat faced part-spherical plastics head 230 secured to the bob weight 228 which is sealingly engageable with a frusto-conical valve seat 232 within the inlet valve housing. The maximum displacement of the valve closure member 226 from the valve seat 232 is limited by means of a pin 234 extending diametrically across the valve housing and the housing of the inlet valve 222 is secured to the lower part of the main housing 210 by means of an annular clamp 236. An annular collection hopper H, having an outlet tap T, is secured around the housing 210 immediately above the clamp 236, for receipt of material removed from the surface of the displacement rod, as will be explained.

The outlet valve 224 is very similar to the inlet valve 222 and similar reference numerals with the addition of a dash indicate corresponding features. It will be noted, however, that the outlet valve 224 has an inlet port 237 whose longitudinal axis extends radially with respect to the longitudinal axis of the displacement rod 216. The outlet valve 224 also has an outlet port 238 for conveying pumped fluid to the desired location.

Between the lower seal assembly 220 and the inlet valve 222 a gap exists between the displacement rod 216 and the inner bore 212 of the housing 210, forming a pump working chamber 242. In a cycle of normal pump operation the displacement rod 216 is partially withdrawn from the working chamber 242, causing the valve closure member 226 of the inlet valve 222 to be lifted from its valve seat 232 and thereby drawing fluid into the pump working chamber 242. When the displacement rod 216 reaches its uppermost displacement and begins to move downwards in the opposite direction, the valve closure member 226 of the inlet valve 222 is reseated on the valve seat 232. This is assisted by the relatively large weight of the bob weight 228 which causes the valve 222 to snap shut quickly. Further downward the displacement rod 216 increases the pressure in the working chamber 242, resulting in displacement of the outlet valve closure member 226 from its valve seat 232' and causing fluid within the working chamber 242 to be displaced through the outlet valve 224 and out of the outlet 238.

The operation of the valve is thus generally conventional. However, the manner of producing a seal around the displacement rod 216 as it moves is significantly different as will be explained in more detail.

The lower seal ring assembly 220 is secured over the upper end of the main housing 210. The seal ring assembly 220 comprises an annular seal ring 255 (FIG. 18) having an undersurface 244 formed into an annular planar ring 246 (apart from one portion 248 which is cut away to a shape which corresponds to that of the outlet port of the housing). The substantially continuous neck portion 244 has a peripheral recess 249 in the outer wall to receive an O-ring 386 which engages sealingly with the upper portion of the inner wall of the main housing 210. The seal ring 244 further comprises a first mounting flange 252 with an aperture 254 for receipt of a securing bolt and a second, elongate mounting flange 256 having two apertures 258, one at each end, for receipt of a respective securing bolt B, the apertures 254 and 258 being equally angularly spaced from each other. The underside of these mounting flanges rest on the top face of the tubular housing 210, the apertures for the securing bolts corresponding to threaded holes provided in the main tubular housing 210.

The seal ring 244 is also formed into a radially inwardly directed annular sealing portion 260. The sealing portion 260 has a very smooth face and, as will be explained, is adapted to engage the outer surface of the displacement rod 216.

Referring to FIG. 17, the upper sealing assembly 218 comprises an annular upper seal ring 264. The lowermost peripheral rim of the upper sealing ring 264 is provided with a recessed shoulder 266 which, in use, engages with the uppermost portion of the lower seal ring 244. The upper seal ring 264 is also provided with an inwardly-directed annular seal portion 268, substantially identical in form to the sealing portion 260 of the lower seal ring 244.

Immediately above the sealing ring portion 268 is a smooth cylindrical lower bore portion 270, at the top of which is a recessed shoulder 272, above which is a further cylindrical bore portion 274 having helical threads 276 extending most of the way down to the shoulder 272, the helical threads being provided to correspond to the helical threads on the cylindrical chamber C.

As best seen in FIG. 16, a tubular sleeve 280 having the same height as the cylindrical portion 270 is located within the cylindrical portion 270 but a circumferential gap 282 exists between the outer surface of the sleeve and the bore 270. Four small radially-extending bores 284 extend through the sleeve 280, the bores being spaced apart equally around the sleeve. The inner face of the sleeve 280 is provided with upper and lower circumferential recesses 292, 294, each of which receives a respective O-ring seal 296, 298.

It should also be noted that the upper seal ring is provided with four radially-extending bores 286 extending through the wall of the ring, the bores 286 being equally angularly spaced around the seal ring. The bores 286 open into a peripheral recess 288 having inclined opposed walls 289 which form a valve seat for receipt of an O-ring seal 290 which thereby forms a one-way valve as will be explained. Six inclined bores 291, equally angularly spaced around the upper seal ring 264, connect the peripheral recess 288 with the undersurface 268 of the seal ring 264.

The periphery of the upper seal ring is provided with three equally-spaced securing apertures 299, corresponding to the apertures 258 of the lower seal ring, and two further securing apertures 299a, for securing the mounting plate, as will be explained.

An oil pump piston 300 is located within the sleeve 280. The piston is annular and comprises an outer upper cylindrical face 302 which is separated by means of an inclined shoulder 304 from a lower cylindrical face 305 of slightly smaller diameter. The inner face 306 of the piston is cylindrical and at its base is formed into an inwardly-directed annular engagement portion 308 which, in use, engages the outer surface of the displacement rod 216. Four apertures 310 extend through the sealing portion 308 in a direction parallel to the longitudinal axis of the displacement rod, the apertures 310 being equally angularly spaced around the piston.

The displacement rod 216 comprises an elongate steel core 312 on which is located a resiliently deformable elastomeric tubular sleeve 314 formed from polyurethane. The sleeve is held in position on the core by means of a mushroom-shaped stainless steel head 316 which is releasably attachable to the steel core 312 by means of an interengaging helical screw thread. A locking bolt 318 of different thread pitch is provided to lock the head in position on the core. At the upper end of the polyurethane tubular sleeve 314 is provided a stainless abutment ring 320.

The pump is assembled from the components described previously and in addition a mounting plate 322 is placed around the outside of the upper seal ring. The mounting plate 322 comprises two radially-extending passageways 323 whose inner ends open into a gap 324 between the outer face of the upper securing ring and the mounting plate 322. The pump is actuated by means of an actuator 100 identical to that of FIG. 6. However the silencers S from the two exhausts E1, E2 from the actuator are connected one each to the two passageways 323 in the mounting plate 322.

The housing components are secured together by bolts B passing through apertures in the mounting plate 322 and the corresponding aligned apertures 299 and 254, 258 in the upper and lower seal rings 264, 255 respectively, the bolts being received in threaded recesses in the housing wall 210. The air actuator (not shown) is also connected to the pump assembly by means of three bolts 325 which are spaced from the mounting plate 322 by a spacing collar 328, one end of which bears against the undersurface of the collar 322. A guard 330 is suspended from the shoulders on the three spacing collars 328 to prevent access to the displacement rod between seals 218, 220.

The displacement rod is caused to reciprocate by means of an actuator (not illustrated) identical to that shown in FIG. 6 and performs a reciprocating movement, as described previously. In view of the fact that the displacement rod 16 comprises a resilient elastomeric tubular sleeve 314, a sealing engagement is formed with the seal portions 268, 260, 308 of the upper and lower seals and of the oil pump piston 300 respectively.

Because of the nature of UV set ink a small quantity of the ink can pass the lower seal 220 in the form of a sticky residue. As the displacement rod is retracted an air blast is provided which, owing to the oil pump contains an amount of lubricant/solvent. This air blast softens the residue on the displacement rod and as the rod passes through the upper seal 218 the residue is wiped from the rod to be blown down into the hopper H.

In this way most of the residue is removed from the rod before it enters the chamber C and as the lubricant/solvent is regularly replenished it does not become unduly contaminated with ink As the displacement rod 216 is displaced upwardly as shown in the Figures, it carries the pump piston 300 with it until the upper end of the pump piston engages an inwardly directed shoulder S provided at the inlet of the chamber C. In this position, the outer cylindrical surface 302 of the piston is still in contact with the upper O-ring seal 296 but the lower O-ring seal 298 is not engaged by the piston 300.

As the displacement rod 216 begins its downward movement it carries the piston 300 with it. Eventually the lower, reduced diameter cylindrical outer surface 305 engages the lowermost O-ring seal 298. This thereby isolates a volume of oil within the peripheral space V between the piston 300 and the collar 280. As the piston 300 is carried downwards still further, the volume defined between the piston 300 and the collar 280 reduces as a result of the fact that a reducing height of the reduced diameter portion 305 defines the volume and an increasing part of the larger diameter portion 302 defines the volume. Thus, the oil or solvent within that volume is compressed, to such an extent that it passes through the radially extending apertures 284 in the collar 280, downwardly along the annular gap 282 between the collar 280 and the upper ring 264 and radially outwardly through the radially extending apertures 286 within the ring, displacing the O-ring seal 290 from the valve seal 289 in the outer surface of the ring and discharging the oil or solvent radially outwardly of the O-ring seal 290.

As mentioned previously, the O-ring seal is in communication with the radially extending passages 323 through the flange 322. These passages 323 receive blasts of air from the exhaust E1, E2 of the air actuator 100 as the displacement rod 216 moves up to or down from its uppermost position. Thus, the air contacts the oil or solvent displaced by the piston 300 into the gap 324 and carries it via the inclined apertures 291 in the upper seal member 264 towards and onto that portion of the displacement rod 216 between the upper and lower seals 218, 220, below the undersurface 268 of the upper seal ring 264. Thus, during each cycle of the displacement rod 216 a small amount of oil and/or solvent is sprayed onto the outer surface of the displacement rod. All portions of the outer surface of the displacement rod which are subjected to high frictional forces thus receive a coating of oil and/or solvent during each cycle of the displacement rod 216, thereby significantly reducing the likelihood of fouling of the pump due to solidification of the material being pumped.

A further embodiment of the present invention is illustrated in FIGS. 21 to 27.

The main housing 210', the inlet valve 222', the outlet valve 224' and the displacement rod 216' are virtually identical to the main housing 210, inlet valve 222, outlet valve 224 and displacement rod 216 respectively of the previous embodiment and thus no detailed description will be given. In the accompanying drawings, features in this embodiment which correspond to those in the previous embodiment are given the same reference, with the addition of a dash.

The main housing 210 of this embodiment shows the addition of a second bore 212" projecting downwardly from the shoulder 250' to form a lower shoulder 250" for the location of an internal scraper 350, as will be explained. The upper and lower seal assemblies 218, 220 of the previous embodiment are dispensed with and instead are replaced with lower and upper displacement rod scrapers 350, 352. Referring firstly to FIG. 24, the lower displacement rod scraper 350 comprises a cylindrical tube section having a continuous peripheral flange 354 located towards its lower end. Beneath the flange, the wall thickness is of reduced diameter and the lowermost portion of the scraper is formed into a radially inwardly-directed smooth scraper ring 356 which, in use, engages the outer surface of the displacement rod 216, as illustrated in FIG. 22. Six equally-spaced slots 358 are formed in the wall of the scraper immediately above the scraper ring 356 and below the level of the mounting flange 354 to allow the passage of material to be pumped, as will be explained.

The upper end of the scraper ring is of a reduced diameter and comprises an inclined shoulder 360 and a reduced diameter upper outer wall 362. It will also be observed that four abutment lugs 364 project beyond the upper end of the main portion of the scraper ring wall, the lugs 364 being equally spaced around the periphery of the scraper ring.

The scraper ring is inserted into the housing 210' and the undersurface of the mounting flange 354 rests on the lowermost shoulder 250" between the main bore portion 212' and the enlarged bore portion 212" of the housing 210'.

Referring to FIG. 25, the upper displacement rod scraper 352 comprises a cylindrical tubular section 366 in which are formed two rows of equally spaced through apertures 368, the apertures in one row being staggered or offset with respect to the apertures of the other row. As best seen in FIG. 26, the edges of the material forming the apertures 368 are formed by a sharply inclined wall 370 which defines a sharp annular knife edge 372 around the entire periphery of each aperture 368. The lowermost portion of the inner face of the tube 366 is formed into a continuous annular sealing surface 374 which engages the outer surface of the displacement rod 216.

A flange 376 projects laterally outward from the outer face of the lower end of the tube 366 and is provided with five securing apertures 380. A substantially continuous tubular neck portion 382 extends longitudinally from the undersurface of the mounting flange 376. A peripheral recess 384 in the outer wall of the neck portion receives an O-ring seal 386 which engages sealingly with the upper portion of the inner wall of the main housing 210' whilst the undersurface of the mounting flange rests on the top face of the main housing.

In use, the undersurface of the flange portion 376 radially inwardly of the collar 382 rests against the upper ends of the four lugs 364 projecting from the upper end of the internal scraper, thereby defining four slots 390 (FIG. 22) for passage of fluid therethrough.

A mounting plate support 391 (FIG. 27) rests on top of the upper rod scraper 352. The support 391 comprises upper and lower tubular sections 392, 394, the upper section 392 having a frusto-conical shoulder 396 in which are formed six equally angularly spaced apertures 398. The top of the lower tubular section 394 is an outwardly directed peripheral securing flange 400 for mating against the lower face of the mounting flange 322'. The lower portion of the support 394 is cut away to leave one elongate projecting support containing two angular spaced apart apertures 402 and one short projecting support containing one angularly spaced aperture 402. The undersurface of the projecting supports 410 abut the upper surface of the mounting flange 376 of the upper scraper 352, ensuring that the space between the flange 376 and the undersurface of the mounting plate 322' is substantially exposed as defined by the gap 412.

The components of the pump are assembled and are secured in place by means of a securing plate 322' substantially identical to that of the previous embodiment. The components are held together by means of securing bolts B', as in the previous embodiment.

When the pump is assembled, it will be observed from FIG. 23 that the sealing portion 356 of the lower scraper ring 350 engages, and deforms radially inwardly, the resilient outer sleeve 314' of the displacement rod 216'. Similarly, the sealing surface 374 of the upper scraper ring 352, together with the portions of the tube 366 other than the apertures 368 deform the resilient sleeve 314 of the displacement rod radially inwardly, thereby providing a seal against the surface of the displacement rod 216.

As best seen FIG. 26, the resilient outer sleeve 314' of the displacement rod expands radially outwardly into the apertures 368 of the upper scraper ring 352, attempting to regain its original diameter, and is tightly engaged by the annular knife edges 372 of the apertures.

As the displacement rod 216' rises during its normal operation, the scraper ring 356 of the lower scraper 350 scrapes the outer surface of the displacement rod, but since there is a large amount of fluid in this area, it is normally possible to remove deposits from the outer surface of the rod without damage to the rod or to the material being pumped. As the rod continues upwards, it passes completely through the scraper ring 356 such that it is no longer in contact therewith.

At the top of its stroke, the rod then starts to descend, thereby closing the inlet valve 222' and inks starts to be forced out of the outlet valve 224'. As the rod engages the lower scraper ring 356 once again, it seals off the main displacement chamber 242' from the outlet port 226' of the housing 210' other than the four apertures 390 immediately above the lower scraper 350 and the six passages 358. Ink is thus forced to flow around the scraper ring and through the six passages 358 immediately above the scraper ring. The fluid being pumped then flows between the inside of the scraper and the outside of the displacement rod 216 until it reaches the undersurface of the main seal 374 of the upper scraper. At this point, the material flows across the bottom of the main seal 374, flushing away any ink that may have been subject to friction and displaces it through the slots 390 between the upper and lower scrapers 352, 350 and thereby out of the housing via the outlet port. Thus, the action of the displacement rod 216' in combination with the lower scraper ring flushes the main seal 374 and thus inhibits the deposition of material which might cause the pump to fail.

Any material deposited on the outer surface of the displacement rod despite the flushing action described previously then encounters the knife edges 372 of the apertures 368 during both the upward and downward travel of the displacement rod. The knife edges scrape off most if not all of any material deposited on the outer surface of the displacement rod, this being aided by the fact that the outer surface bows outwardly into the apertures, thereby helping to loosen any material deposited on the surface.

As for the previous embodiment, pressurised air is fed into the vicinity of the apertures from the exhaust of the pump actuator via the apertures 398 in the inclined shoulder 396 in the mounting plate support, as the displacement rod moves up to or down from its uppermost position. Thus, any material removed from the outer surface of the rod by virtue of the knife edges 372 of the apertures 368 is exhausted to atmosphere by means of the air pressure via the gaps 412 between the mounting plate support and the upper scraper and is collected in the hopper H.

The invention is not restricted to the details of the foregoing embodiments. In particular, although the specific embodiments have been described solely with reference to fluid pumps and fluids such as UV ink, the invention is equally applicable to any reciprocating and/or rotating member which is slidably and sealingly displaceable with respect to a sealing portion. For example, the invention is applicable to the pumping and/or control of any of the problematic fluids such as those containing abrasive particles.

What is claimed is:

1. In an assembly comprising an elongate member slidably disposed with respect to a sealing member, the elongate member comprises a resiliently deformable coating and the sealing member comprises a substantially rigid sealing portion which engages the coating and resiliently deforms it in the region of contact.

2. An assembly as claimed in claim 1, wherein the coating comprises a single layer.

3. An assembly as claimed in claim 1, wherein the coating comprises a plurality of layers.

4. An assembly as claimed in claim 3, comprising a plurality of layers of different materials.

5. An assembly as claimed in claim 1, wherein the coating is provided only in that region of the elongate member which will frictionally engage the substantially rigid sealing portion.

6. An assembly or pump as claimed in claim 1, wherein the substantially rigid sealing portion is annular and the resiliently deformable portion with which the substantially rigid sealing portion is engagable is cylindrical or tubular.

7. In an assembly comprising a piston slidably disposed within a cylinder, the cylinder comprises a resiliently deformable lining and the piston comprises a substantially rigid sealing portion which engages the lining and resiliently deforms it in the region of contact.

8. An assembly as claimed in claim 7, wherein the lining comprises a single layer.

9. An assembly as claimed in claim 7, wherein the lining comprises a plurality of layers.

10. An assembly as claimed in claim 9, wherein the lining comprises a plurality of layers of different materials.

11. A fluid pump comprising a housing having an internal displacement chamber, an inlet, an outlet and a displacement rod which passes reciprocally into the displacement chamber through an aperture in the wall of the pump housing, wherein the displacement rod comprises a resiliently deformable sleeve or coating and the housing comprises a sealing member having a substantially rigid sealing portion which engages the sleeve or coating and resiliently deforms it in the region of contact.

12. A fluid pump as claimed in claim 11, wherein the sleeve or coating comprises a single layer.

13. A fluid pump as claimed in claim 11, wherein the sleeve or coating comprises a plurality of layers.

14. A fluid pump as claimed in claim 13, comprises a plurality of layers of different materials.

15. A fluid pump as claimed in claim 11, wherein the sleeve or coating is only provided in that region of the displacement rod which will frictionally engage the substantially rigid sealing portion.

16. A fluid pump comprising a housing having an internal displacement chamber, an inlet, an outlet and a displacement rod which is reciprocable sealingly within the displacement chamber, the displacement chamber comprising a resiliently deformable lining and the piston comprising a substantially rigid sealing portion which engages the lining and resiliently deforms it in the region of contact.

17. A fluid pump as claimed in claim 16, wherein the lining comprises a single layer.

18. A fluid pump as claimed in claim 16, wherein the lining comprises a plurality of layers.

19. A fluid pump as claimed in claim 18, comprising a plurality of layers of different materials.

20. A fluid pump comprising a housing having an internal displacement chamber, an inlet, an outlet and a displacement rod which passes reciprocally into the displacement chamber through an aperture in the wall of the pump housing, the pump further comprising inner and outer spaced-apart seal means which engage the outer surface of the displacement rod and means for applying fluid to the surface of that portion of the displacement rod between the inner and outer seal means.

21. A fluid pump as claimed in claim 20, wherein the fluid is applied to the surface of the displacement rod during the pumping cycle.

22. A fluid pump as claimed in claim 20, wherein the means for applying fluid comprises an annular piston carried by the displacement rod, the piston having a sealing surface of non-constant profile which is releasably engagable with a seal means to isolate a volume of fluid to be applied and which is movable to compress the isolated volume of fluid and thereby displace it towards the displacement rod.

23. A fluid pump as claimed in claim 22, wherein the piston comprises a first portion of smaller diameter which is releasably engagable with the seal means and a second portion of larger diameter, whereby movement of the larger diameter portion towards the seal means reduced the isolated volume and thereby compresses the fluid to be applied to the rod.

24. A fluid pump as claimed in claim 20, further comprising pressure means to assist in the application of the fluid to the surface of the rod.

25. A fluid pump as claimed in claim 24, wherein the pressure means comprises pressurized gas which causes the fluid to be sprayed onto the surface of the displacement rod.

26. A fluid pump as claimed in claim 25, wherein the pressurised gas is obtained from the exhaust of an air actuator used for displacing the displacement rod.

27. A fluid pump as claimed in claim 20, wherein the displacement rod comprises a resiliently deformable sleeve or coating and wherein the inner and outer seal means are substantially rigid.

28. A fluid pump comprising a housing having an internal displacement chamber, an inlet, an outlet, a displacement rod which passes reciprocally into the displacement chamber through an aperture in the wall of the pump housing and a seal means which engage the outer surface of the displacement rod and define a boundary of the displacement chamber, the pump further comprising guide means to ensure that fluid displaced by the displacement rod passes over the inner portion of the seal means before being discharged through the outlet.

29. A fluid pump as claimed in claim 28, wherein the pump comprises a tube through which the displacement rod passes with clearance, the tube defining one or more gaps adjacent to the seal means, forming the guide means for passage of pumped fluid but otherwise isolating the internal displacement chamber from the outlet.

30. A fluid pump as claimed in claim 29, wherein one end of the tube comprises a plurality of projections which space the end of the tube from the seal means, the gaps being defined between the projections.

31. A fluid pump as claimed in claim 30, wherein the projections abut the seal means, whereby the gaps are partially defined by the seal means.

32. A fluid pump as claimed in claim 28, wherein the other end of the tube comprises an annular portion which engages the outer surface of the displacement rod.

33. A fluid pump as claimed in claim 32, wherein the annular portion acts as a scraper.

34. A fluid pump as claimed in claim 33, wherein the tube comprises one or more apertures which allow passage into the tube of fluid to be pumped when the displacement rod is actuated.

35. A fluid pump as claimed in claim 28, wherein the displacement rod comprises a resiliently deformable sleeve or coating and the seal means are substantially rigid.

36. A fluid pump comprising a housing having an internal displacement chamber, an inlet, an outlet, a displacement rod which passes reciprocally into the displacement chamber and seal means which engage the outer surface of the displacement rod and define a boundary of the displacement chamber, the displacement rod comprising a resiliently deformable sleeve or coating and the seal means being substantially rigid, the pump further comprising a scraper means outwardly of the seal means which comprises one or more edges for scraping unwanted deposits off the resiliently deformable sleeve or coating of the displacement rod.

37. A fluid pump as claimed in claim 36, wherein the scraping means comprises a tube having a plurality of apertures therein.

38. A fluid pump as claimed in claim 37, wherein the periphery of each of the apertures is formed into a scraper edge.

39. A fluid pump as claimed in claim 37, wherein the diameter of the tube is smaller than the outer diameter of the displacement rod.

* * * * *